United States Patent [19]

Abe

[11] Patent Number: 5,286,945
[45] Date of Patent: Feb. 15, 1994

[54] APPARATUS FOR HEATING WORKPIECES TO BOND THE SAME

[75] Inventor: Noriyoshi Abe, Hidakamachi, Japan

[73] Assignees: Kabushiki Kaisha Yosetsu Gijutsu Kenkyusho, Saitama; Kabushiki Kaisha Technosystems, Tokyo, both of Japan

[21] Appl. No.: 706,285

[22] Filed: May 28, 1991

[30] Foreign Application Priority Data

May 30, 1990 [JP] Japan .................................. 2-140563

[51] Int. Cl.$^5$ ................................................ B23K 1/00
[52] U.S. Cl. ............................... 219/85.16; 219/85.18; 219/85.19
[58] Field of Search ............... 219/86.31, 86.41, 85.14, 219/85.15, 85.16, 85.18, 85.19, 110

[56] References Cited

U.S. PATENT DOCUMENTS

| 2,494,847 | 1/1950 | Welch . | |
| 2,768,596 | 10/1956 | Kalbow et al. | 219/85.19 |
| 3,119,006 | 1/1964 | Faulconer | 219/85.14 |
| 4,835,356 | 5/1989 | Abe . | |

FOREIGN PATENT DOCUMENTS 0070904 2/1983 European Pat. Off. .
57-149057 12/1982 Japan .
WO82/03812 11/1982 World Int. Prop. O. .

Primary Examiner—Clifford C. Shaw
Attorney, Agent, or Firm—Frishauf, Holtz, Goodman & Woodward

[57] ABSTRACT

An apparatus according to the present invention comprises a fixed electrode rod and a movable electrode unit movable toward and away from the fixed electrode rod. The movable electrode unit includes a first electrode rod for holding a set of workpieces with a predetermined force in cooperation with the fixed electrode rod, and a second electrode rod in contact with the first electrode rod. Each electrode rod is covered by means of a water jacket, and cooling water is continually fed into the respective water jackets of the rods during the operation of the apparatus. When energized, the first and second electrode rods generate heat on the basis of contact resistance between them, resisting the cooling effect of the water jackets. As a result, the workpieces held between the first electrode rod and the fixed electrode rod are heated to a predetermined temperature.

18 Claims, 23 Drawing Sheets

FIG. 34
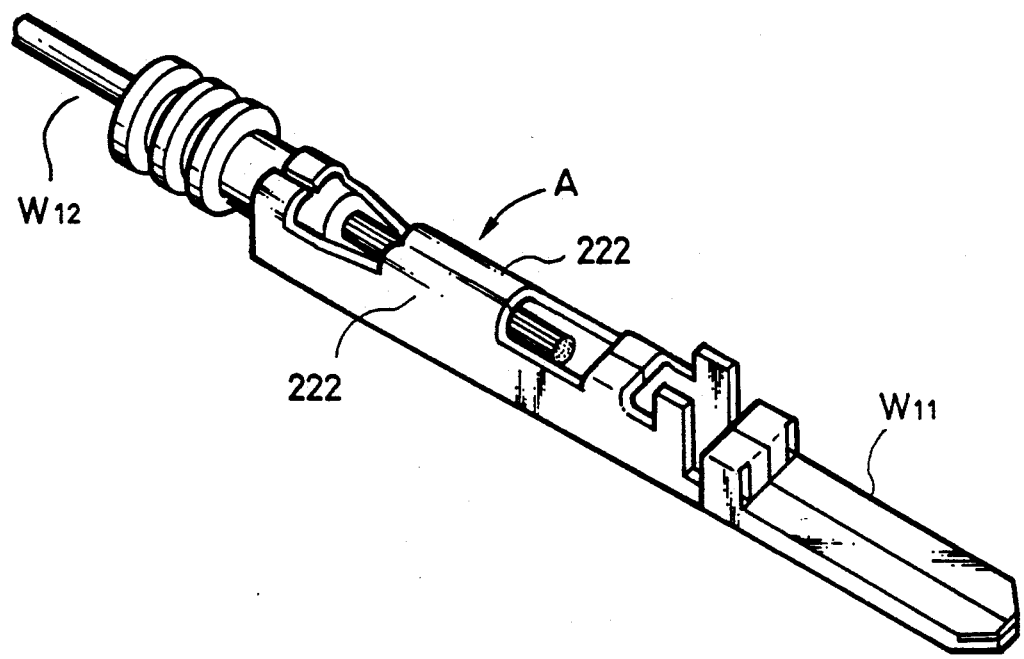
FIG. 35
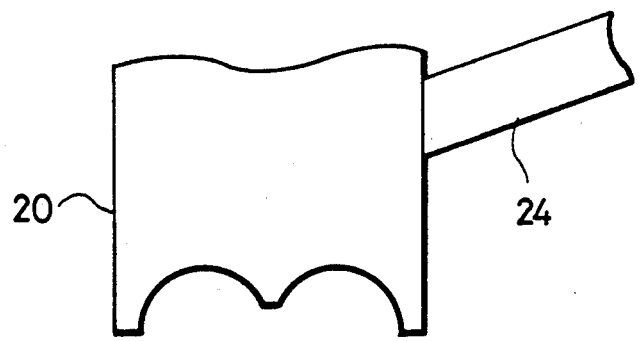
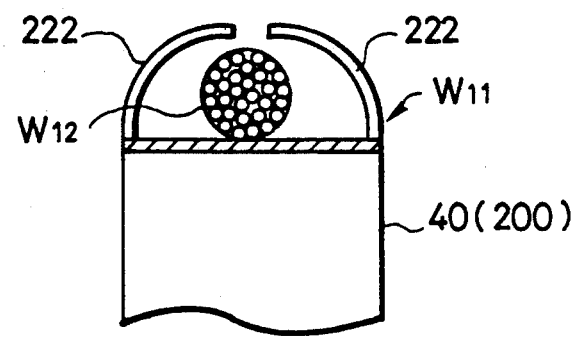

FIG. 38
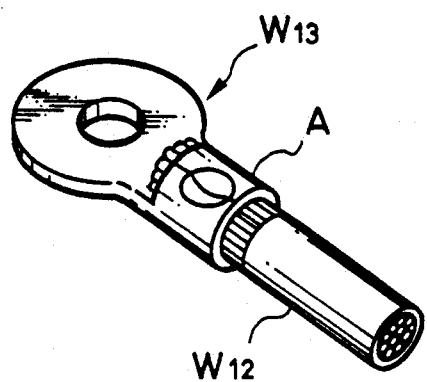
FIG. 39
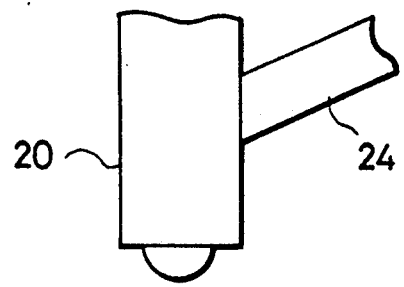
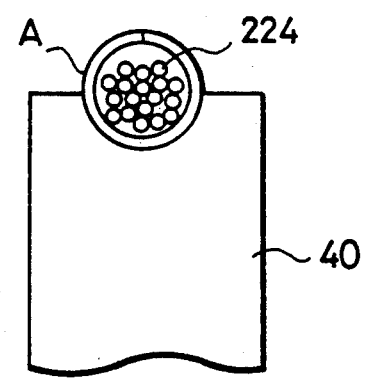

APPARATUS FOR HEATING WORKPIECES TO BOND THE SAME

BACKGROUND OF THE INVENTION

1. Field of the Invention

The present invention relates to an apparatus for heating workpieces to be bonded together, such as a soldering apparatus.

2. Description of the Related Art

In manually soldering workpieces by means of a soldering iron, an operator must hold the iron in one hand and solder in the other. Therefore, if the workpieces to be bonded are a terminal and a lead wire, for example, the workpieces cannot be soldered unless an end portion of the lead wire is previously wound around the terminal. Thus, soldering the lead wire and the terminal requires very much time and labor.

If the operator unexpectedly touches the workpieces before molten solder is solidified by cooling, the soldering position of the workpieces sometimes may be dislocated from the object position, even though the workpieces have shapes such that they can easily mate with each other.

Skill of a high order is required to ensure electrical connection between the workpieces by soldering. It is very difficult for an unskilled operator, therefore, to effect stable, high-quality soldering.

Thus, if the soldering iron is unsatisfactorily heated, or if it is improperly contacted to the workpieces, the molten solder cannot smoothly diffuse, so that the solder may come off the workpieces or become lumpy. As a result, the workpieces may fail to be electrically connected, and if not, the soldered portion cannot enjoy a fine appearance or shape, and the bonding strength of the solder is subject to substantial variations.

In the soldering work using the soldering iron, as described above, the greatest possible care and high-order skill are required of the operator. Accordingly, excessive labor is forced upon the operator, and the cycle time required for each soldering operation is inevitably long.

The workpieces are expected to be heated not only in the soldering work described above, but also in workpiece bonding work using a hot-melt resin, bonding work based on resin caulking, etc. Conventionally, hot-blast heating or ultrasonic heating is used in these bonding operations except for the soldering work. These heating methods, however, require a long time to heat the workpieces, as well as use of bulky equipment, so that the operating time for the bonding work cannot be shortened.

SUMMARY OF THE INVENTION

The object of the present invention is to provide a workpiece heating apparatus which is applicable to various bonding operations and enjoys high flexibility in use, and in which workpieces can be heated in a short time, so that the operating cycle time can be considerably shortened.

The above object is achieved by means of an apparatus according to the present invention, which comprises: a workpiece rest; a movable electrode unit movable toward and away from the workpiece rest, the movable electrode unit including a first electrode rod for holding workpieces with a predetermined force in cooperation with the workpiece rest, when the workpieces are placed overlapping each other on the workpiece rest, and a second electrode rod in contact with the first electrode rod; a current supply circuit for supplying current between the first and second electrode rods so that the electrode rods generate heat by means of contact resistance between the electrode rods; control means for controlling the current supply by means of the current supply circuit; and cooling means for compulsorily cooling the first and second electrode rods.

According to the apparatus described above, when current is supplied between the first and second electrode rods, the first electrode rod generates heat attributable to contact resistance. If the workpieces are held between the first electrode rod, caused to generate heat by current supply, and the workpiece rest, therefore, they can be heated to a predetermined temperature in a short time by means of the first electrode rod.

If solder is supplied to the workpieces when the workpieces are heated, it is melted by heat from the workpieces, so that the junction between the workpieces is covered by the molten solder. Thereafter, if the first and second electrode rods are cooled by using cooling means after the current supply between them is stopped, the molten solder is also quickly cooled and solidified.

Thus, the operating cycle time for the soldering work can be considerably shortened by the aforesaid rapid heating of the workpieces and quick cooling of the molten solder.

Since the workpieces are held between the first electrode rod and the workpiece rest before the molten solder is cooled and solidified after the workpiece heating, the workpieces can be soldered in an accurate position without unexpectedly moving with respect to each other.

If the apparatus of the present invention is applied to the soldering work, it should preferably be provided with a feeding device for supplying the solder by a predetermined amount at a time.

If the workpieces are formed of electrically conductive materials, moreover, the workpiece rest should preferably be in the form of a fixed electrode rod of the same material as the first and second electrode rods, the fixed electrode rod and the second electrode rod being connected electrically to each other. With use of the fixed electrode rod constructed in this manner, current flows also to the fixed electrode rod from the first electrode rod through the workpieces after the first electrode rod comes into contact with the workpieces, so that the fixed electrode rod also generates heat attributable to its internal resistance. In this case, therefore, the workpieces are heated by means of both the first electrode rod and the fixed electrode rod, so that the time required for the workpiece heating can be further shortened.

If the workpiece rest is formed as the fixed electrode rod, the cooling means should preferably cool the fixed electrode rod as well as the first and second electrode rods.

The cooling time can be shortened if the first and second electrode rods and the fixed electrode rod are cooled by means of a coolant. Preferably, therefore, each electrode rod should be covered by means of a water jacket.

Preferably, moreover, the apparatus of the present invention should further comprises means for varying the direction of access of the first electrode rod of the movable electrode unit to the workpiece rest. With use of this means, the workpieces can be held between the first electrode rod and the workpiece rest without being restricted by the workpiece shapes, so that the apparatus can be improved in flexibility in use.

If the apparatus of the present invention is applied to bonding work for workpieces using a hot-melt resin, a feeding device for supplying the hot-melt resin to the workpieces should only be used in place of the aforesaid solder feeding device.

If the apparatus of the present invention is applied to hot-caulking work for workpieces made of plastics, the aforesaid feeding device need not be used.

According to the apparatus of the present invention, moreover, even if one of the workpieces is a covered lead wire, it can be soldered to the other workpiece in like manner after its covering layer is heated to be removed by utilizing heat generated by the first electrode rod.

If a sufficient pressure loading is ensured for the workpieces held between the first electrode rod and the workpiece rest, furthermore, the workpieces can be soldered together after they are crimped to each other.

If the workpieces are electrically conductive, and if the fixed electrode rod is used as the workpiece rest, on the other hand, the workpieces can be soldered together after they are spot-welded between the first electrode rod and the fixed electrode rod.

BRIEF DESCRIPTION OF THE DRAWINGS

The present invention, together with its objects and advantages, will become more fully understood from the detailed description given herein below and the accompanying drawings, which are given by way of illustration only, and thus, are not limitation of the present invention, and wherein:

FIG.34 is a perspective view showing a combination of a crimped terminal and a covered lead wire for use as workpieces;

FIGS. 35 and 36 are views showing parts of a first electrode rod and a fixed electrode rod suited for connection between the terminal and the covered lead wire of FIG. 34;

FIG. 38 is a perspective view showing another crimped terminal connected with a covered lead wire;

FIG. 39 is a view showing parts of a first electrode rod and a fixed electrode rod suited for connection between the covered lead wire and the terminal of FIG. 38;

DETAILED DESCRIPTION OF THE PREFERRED EMBODIMENTS

Figure 1:
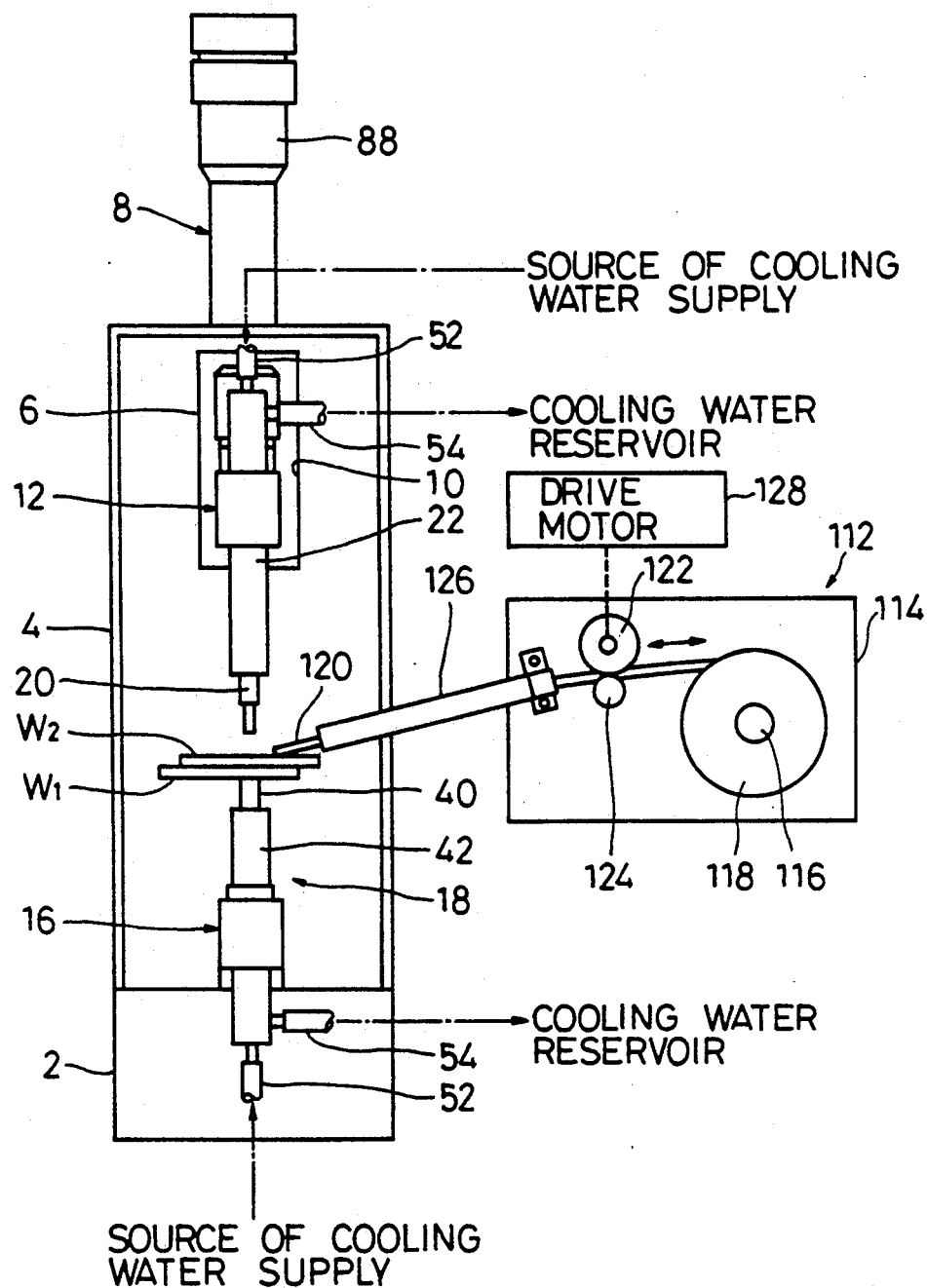
FIG. 1 is a front view of a soldering apparatus to which the present invention is applied.
Figure 2:
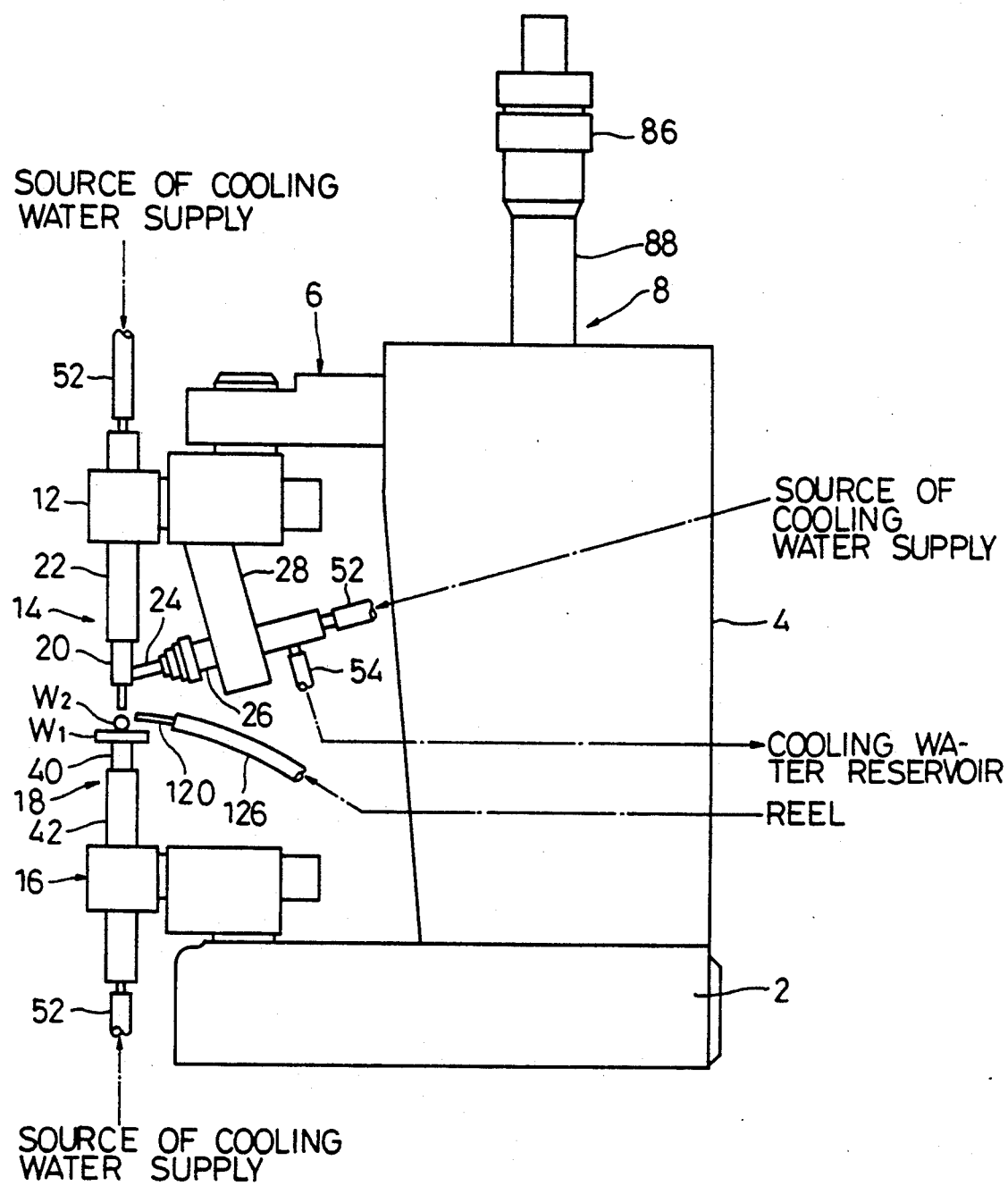
FIG. 2 is a side view of the soldering apparatus of FIG. 1.

Referring to FIGS. 1 and 2, there is shown an outline of an apparatus suitably used to solder workpieces. The soldering apparatus comprises a rectangular base 2, on which a frame 4 is fixed. The frame 4, which is shaped like a box extending upward, is located on the righthand side portion (FIG. 2) or the rear portion of the base 2.

A press arm 6 protrudes from the front of the frame 4. Located at the upper part of the frame 4, the arm 6 extends horizontally toward the front side of the base 2. The press arm 6 can be moved in the vertical direction by means of a drive mechanism 8 in the frame 4. To allow this vertical movement of the arm 4, a slot 10 is formed in the front wall of the frame 4. The drive mechanism 8 will be described in detail later.

A movable electrode unit 14 is mounted on the distal end portion of the press arm 6 by means of a support 12. On the other hand, a fixed electrode unit 18 is mounted on the front portion of the base 2 by means of a support 16.

The movable electrode unit 14 includes a first electrode rod 20 which, extending vertically, is connected to the support 12 by means of a water jacket 22.

As seen from FIG. 2, the movable electrode unit 14 further includes a second electrode rod 24, which is attached to a bracket 28 by means of a water jacket 26. The bracket 28 is connected to the support 12. The second electrode rod 24 is kept inclined so that its lower end is in contact with the lower end portion of the first electrode rod 20.

Figure 3:
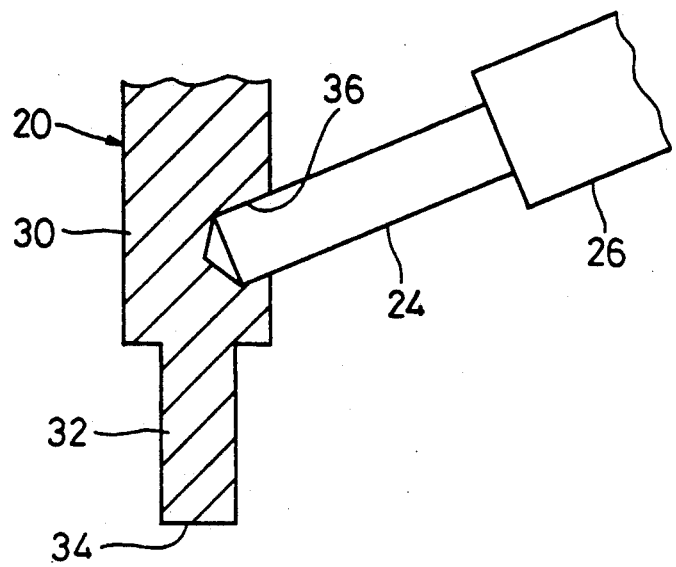
FIG. 3 is a sectional view showing a contact portion between first and second electrode rods shown in FIG. 1.

FIG. 3 shows the detail of a contact portion between the first and second electrode rods 20 and 24. As seen from FIG. 3, the lower end portion of the first electrode rod 20, which is exposed from the water jacket 22, is stepped, and has a large-diameter portion 30 and a small-diameter portion 32 arranged from top to bottom. In this embodiment, the lower end face of the small-diameter portion 32 is a flat surface. A hole 36 is formed in the outer peripheral surface of the large-diameter portion 30 of the first electrode rod 20 so as to extend diagonally downward. The lower end portion of the second electrode rod 24 is fitted in the hole 36, so that the rod 24 is intimately in contact with the first electrode rod 20, whereby the two rods 20 and 24 are connected electrically to each other.

Figure 4:
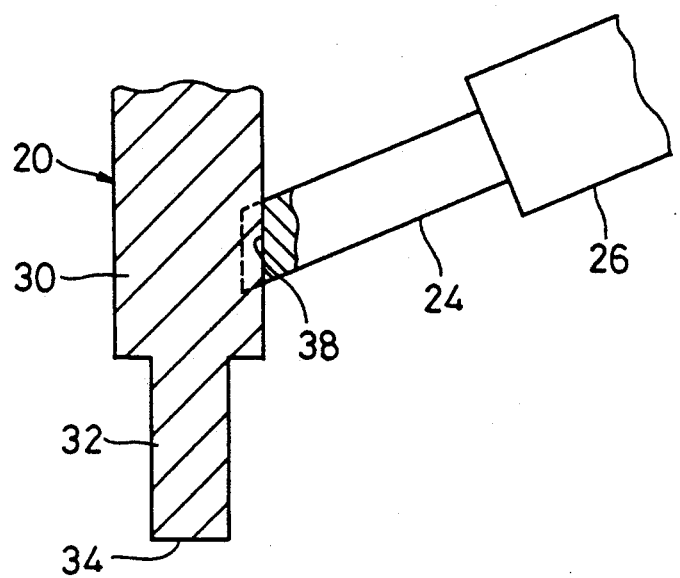
FIG. 4 is a sectional view showing a modification of the contact portion.
Figure 5:
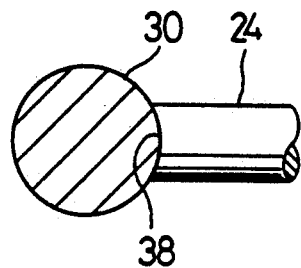
FIG. 5 is a cross-sectional view of the contact portion of FIG. 4.

The hole 36 in the first electrode rod 20 is not essential to the electrical connection of the first and second electrode rods 20 and 24. Thus, if an end face of the second electrode rod 24 is in the form of an arcuate concave surface 38 which mates with the outer peripheral surface of the first electrode rod 20, as shown in FIGS. 4 and 5, the two electrode rods 20 and 24 can be connected electrically to each other by only fitting the concave surface 38 of the second rod 24 on the large-diameter portion 30 of the first rod 20.

The fixed electrode unit 18 includes a fixed electrode rod 40, which is mounted on the support 16 by means of a water jacket 42. The fixed electrode rod 40 vertically extends so as to be coaxial with the first electrode rod 20, and its upper end face is opposed to the lower end face of the rod 20.

Since the respective water jackets 22, 26 and 42 of the electrode rods 20, 24 and 40 resemble in construction, so that only the water jacket 22 will now be described with reference to the drawing of FIG. 6. The water jacket 22 is in the form of a hollow cylinder, and a male screw portion 41 is formed on the lower portion of the water jacket 22. A retainer 42 for holding the first electrode 20 to the water jacket 22 is screwed on the male screw portion 41. More particularly, the retainer 42 is provided with a female screw hole 43 into which the mate screw portion 41 of the water jacket 22 is screwed. The upper end portion of the large-diameter portion 30 is fitted into the lower end portion of the water jacket 22, whereby a flange 44 of the large-diameter portion 30 is sandwiched between the water jacket 22 and the retainer 42. A seal 45 is further inserted between the flange 44 and the lower end portion of the water jacket 22.

Figure 6:
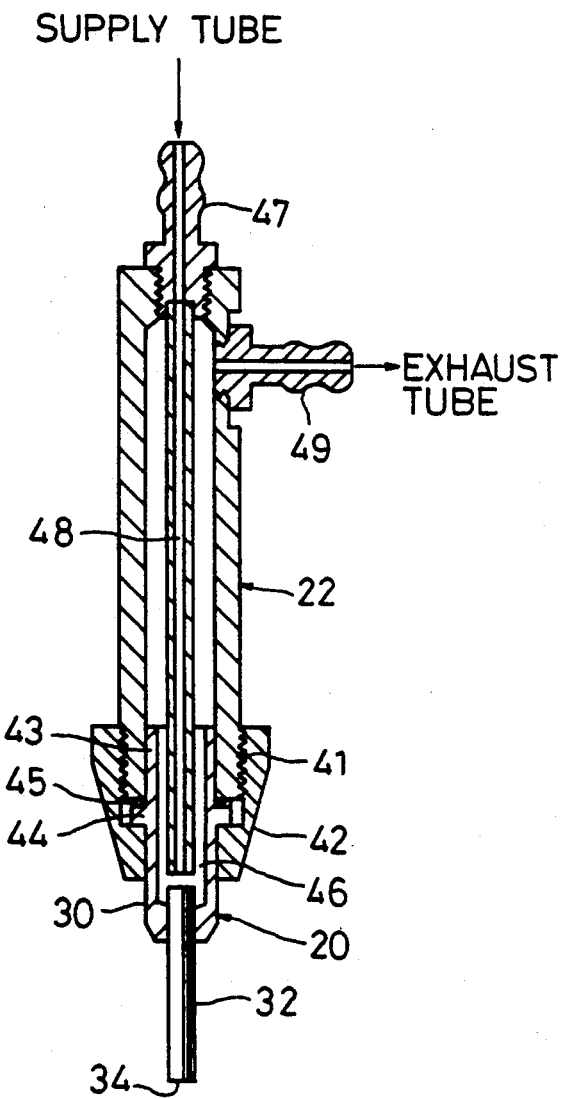
FIG. 6 is a sectional view showing a water jacket of the first electrode rod.

As seen from FIG. 6, the large-diameter portion 30 and the small-diameter portion 32 of the first electrode rod 20 are made of separate parts, the upper end of the small-diameter portion 32 is fitted into the large-diameter portion 30 so that the small-diameter portion 32 is fixed to the large-diameter portion 30. The large diameter portion 30 is provided with a hole 46 which is opened at the upper end thereof and communicated with the interior of the water jacket 22.

A supply connector 47 is screwed into the upper end of the water jacket 22. The supply connector 47 has a lower end which is exposed to the interior of the water jacket 22 and connected to the upper end of a supply pipe 48. The supply pipe 48 coaxially extends in the water jacket 22 and the large-diameter portion 30, the lower opening of the supply pipe 48 is opposed and close to the upper end of the small-diameter portion 32. An exhaust connector 49 communicated with the interior of the water jacket 22 is screwed into the peripheral wall of the upper portion of the water jacket 22.

Thus, if the supply connector 47 is connected to a source of cooling water supply (not shown) by means of a flexible supply tube 52 (see FIG. 1), and if the exhaust connector 49 is connected to a cooling water reservoir by means of a flexible exhaust tube 54 (see FIG. 1), cooling water is fed through the supply connector 47 into the supply pipe 48 in the water jacket 22 and injected from the lower opening of supply pipe 48 toward the upper end of the small-diameter 32 of the first electrode rod 20, whereby the small-diameter portion 32 of the first electrode rod 20 is cooled efficiently. The cooling water injected from the supply pipe 48 in the water jacket 22 flows upward in the hole 46 of the large-diameter portion 30 and the interior of the water jacket 22 and is then discharged from the water jacket 22 by means of the exhaust connector 49 and the exhaust tube 54.

The water jackets 26 and 42, like the water jacket 22, each have a supply connector and an exhaust connector, which are connected to the supply tube 52 and the exhaust tube 54, respectively.

Preferably, the electrode rods 20, 24 and 40 are formed of metal material, such as molybdenum, tungsten, or a tungsten-based alloy, which is reluctant to be wetted by solder. In this embodiment, the rods are formed of a tungsten-based alloy which contains yttrium, thorium, cerium, zirconium, etc.

Figure 7:
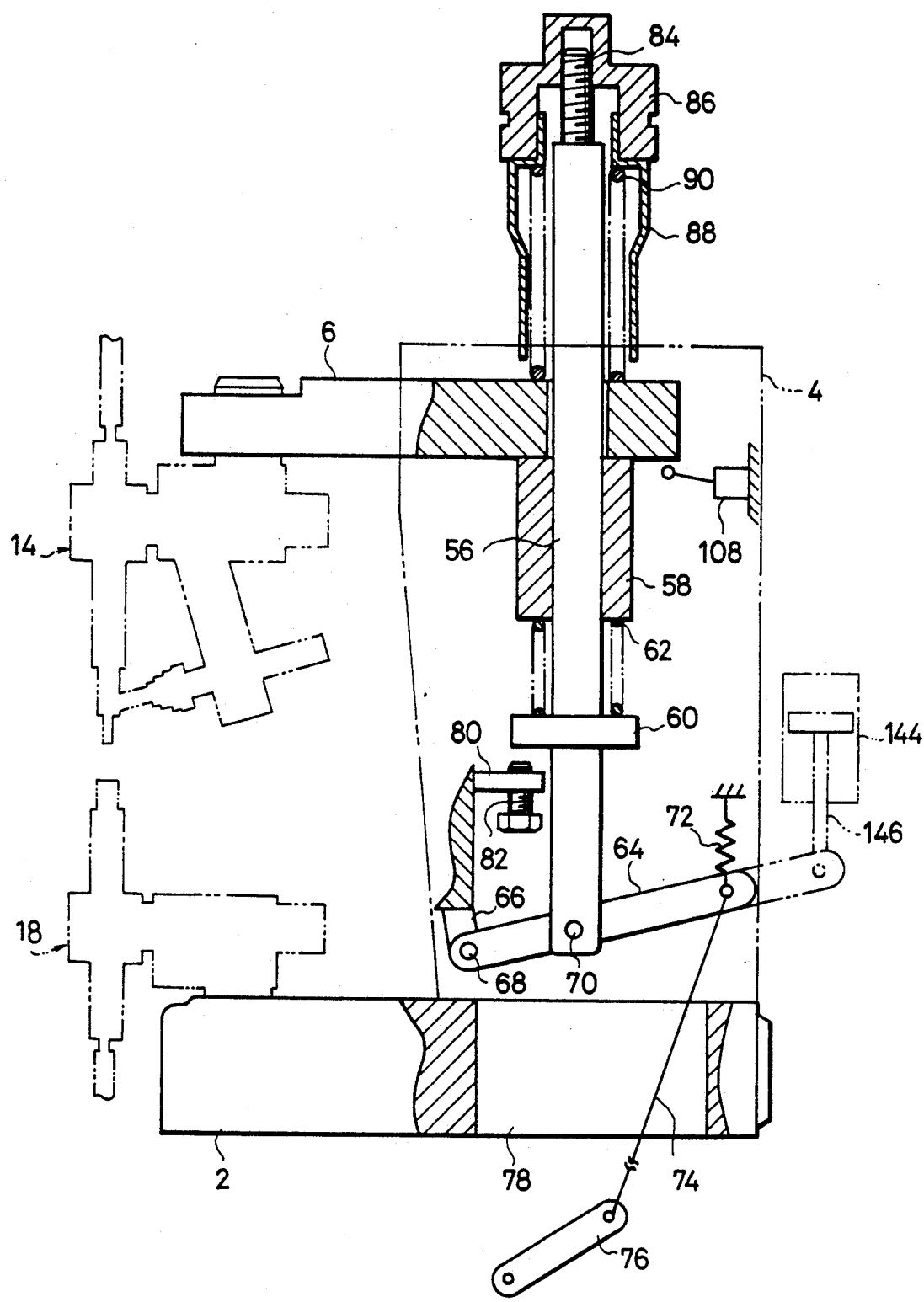
FIG. 7 is a side view showing a drive mechanism for a movable electrode unit in the apparatus of FIG. 1.

The detail of the aforementioned drive mechanism 8 is shown in FIG. 7. The mechanism 8 includes a drive column 56 which supports the press arm 6. The column 56 vertically extends through the proximal end portion of the arm 6. A cylindrical guide 58 is fixed to the lower surface of the proximal end portion of the press arm 6, and the drive column 56 extends downward through the guide 58 for sliding motion. Thus, the vertical motion of the column 56 is guided by means of the guide 58.

A flange 60 is formed integrally on that part of the drive column 56 which is situated below the guide 58. A first supporting spring 62, formed of a compression coil spring, is interposed between the flange 60 and the guide 58. The spring 62 urges the press arm 6 upward.

On the other hand, the drive column 56 is supported on the frame 4 by means of a lever 64. One end of the lever 64 is supported on a bracket 66 on the side of the frame 4 by means of a supporting pin 68, so that the lever 64 is vertically rockable. The lower end of the drive column 56 is connected to the middle portion of the lever 64 by means of a connecting pin 70. The other end of the lever 64 is suspended from part of the frame 4 by means of a tension spring 72. The spring 72 urges the other end of the lever 64 upward, so that the lever 64 is situated in an upwardly rocked position. Thus, the press arm 6, as well as the drive column 56, is held in its up position.

One end of a wire 74 is connected to the other end of the lever 64, and the other end of the wire 74 to a pedal 76. In this embodiment, the wire 74 extends downward through an opening 78 in the base 2 and a work table (not shown) which carries the whole apparatus thereon. Thus, if an operator works the pedal 76, the lever 64 is rocked downward against the urging force of the tension spring 72, so that the drive column 56 is lowered together with the press arm 6.

A bracket 80, which is attached to the frame 4, is disposed under and opposite to the flange 60 of the drive column 56. A screw or stopper 82 is screwed in the bracket 80 so that one end of the stopper 82 projects from the bracket 80 toward the flange 60 of the drive column 56. The space between the one end of the stopper 82 and the flange 60 defines a downstroke of the column 56. The downstroke can be adjusted by changing the screwing stroke of the stopper 82.

The upper end portion of the drive column 56 projects above the press arm 6, that is, above the frame 4. The top end of the column 56 is formed as a constricted screw portion 84, which is fitted with a cap nut 86. A cover pipe 88 is disposed between the nut 86 and the press arm 6 so as to surround the drive column 56. A second supporting spring 90, formed of a compression coil spring, is interposed between the pipe 88 and the column 56. The spring 90, which extends between the cover pipe 88 and the press arm 6, urges the pipe 88 or the cap nut 86 and the arm 6 to recede from each other. With respect to the axial direction of the drive column 56, therefore, the press arm 6 is urged both upward and downward by means of the first and second supporting springs 62 and 90, so that it is situated in a predetermined axial position on the drive column 56. The urging force of the second supporting spring 90 is greater than that of the first supporting spring 62.

Figure 8:
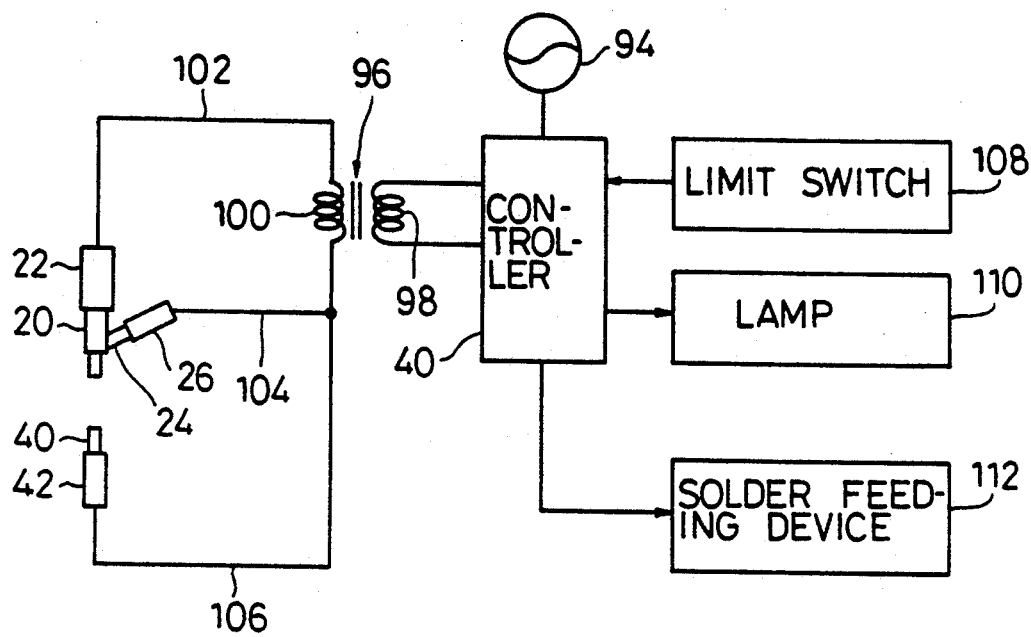
FIG. 8 is a diagram showing a control circuit of the apparatus of FIG. 1.

Referring now to FIG. 8, there is shown a power supply circuit for the electrode rods 20, 24 and 40. This circuit includes a controller 92, which is connected to a commercial power source 94. On the other hand, the controller 92 is connected with a transformer 96, that is, a primary coil 98 of the transformer 96. One end of a secondary coil 100 of the transformer 96 is connected to the first electrode rod 20 by means of a feeder line 102, and the other end of the coil 100 is connected to the second electrode rod 24 by means of a feeder line 104. Also, the other end of the secondary coil 100 is connected to the fixed electrode rod 40 by means of a feeder line 106.

Further, the controller 92 is connected electrically with a limit switch 108, a lamp 110, and a solder feeding device 112. As shown in FIG. 7, the limit switch 108 is situated near the proximal end portion of the press arm 6, and is fixed to the frame 4. The switch 108 is turned on when the arm 6 is lowered, and delivers its on-signal to the controller 92.

As shown in FIG. 1, the solder feeding device 112 is located beside the frame 4. The device 112 has a frame 114, and a shaft 116 protrudes from the front face of the frame 114. A reel 118 is removably mounted on the shaft 116. A thread of solder 120 is wound around the reel 118.

Further, a feed roller 122 and a pinch roller 124 are rotatably mounted on the frame 114, and the solder 120 on the reel 118 is drawn out through the space between the rollers 122 and 124. After passing between the two rollers 122 and 124, the solder 120 is guided through a guide tube 126 to a predetermined position near the fixed electrode rod 40.

The feed roller 122 is connected to a drive motor 128, which can rotate the roller 122 in either direction in response to a command signal from the controller 92. As the feed roller 122 rotates forwardly or reversely, the solder 120 is paid out from or wound up on the reel 118.

Referring now to FIGS. 9 to 12, processes of operation of the soldering apparatus will be described.

Figure 9:
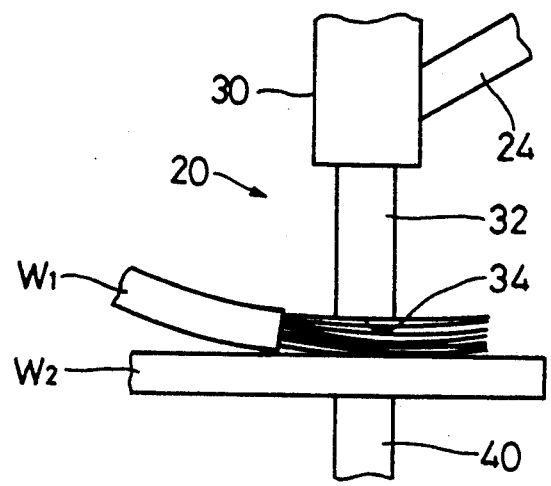
FIG. 9 is a view showing a state in which workpieces are held between a fixed electrode rod and the first electrode rod.

FIG. 9 shows workpieces W1 and W2 to be soldered together by means of the soldering apparatus. The workpieces W1 and W2 are an electric terminal and a covered lead wire, respectively. An end portion of the covered lead wire W2 previously exposed for soldering with the workpiece W1.

The individual water jackets 22, 26 and 42 of the soldering apparatus are supplied with the cooling water so that the electrode rods 20, 23 and 40 are always cooled by means of the water.

In this state, the operator joins the respective predetermined portions of the workpieces W1 and W2 together, and hold them on the upper end face of the fixed electrode rod 40. If the operator works the pedal 76 shown in FIG. 7, thereafter, the lever 64 is rocked downward against the urging force of the tension spring 72, so that the drive column 56 is lowered together with the press arm 6. Thus, the movable electrode unit 14 descends toward the fixed electrode unit 18.

Figure 10:
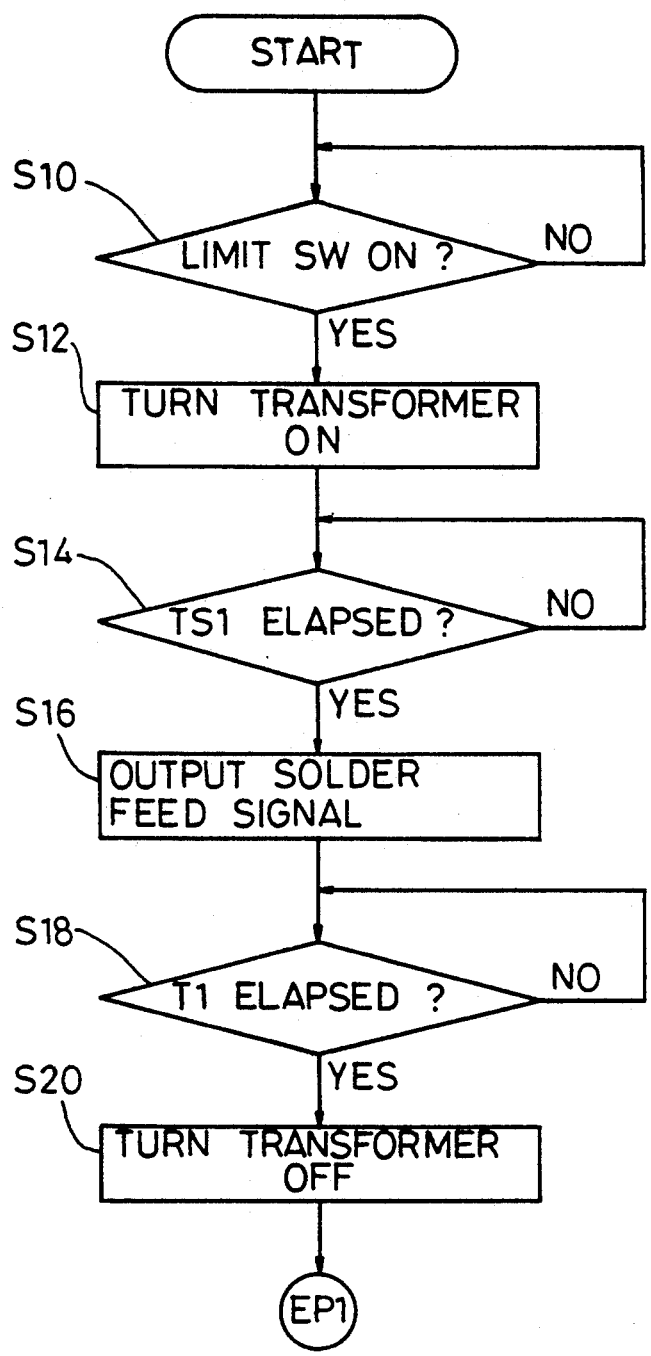
FIGS. 10 and 11 are flow charts showing processes of operation of the apparatus of FIG. 1.
Figure 11:
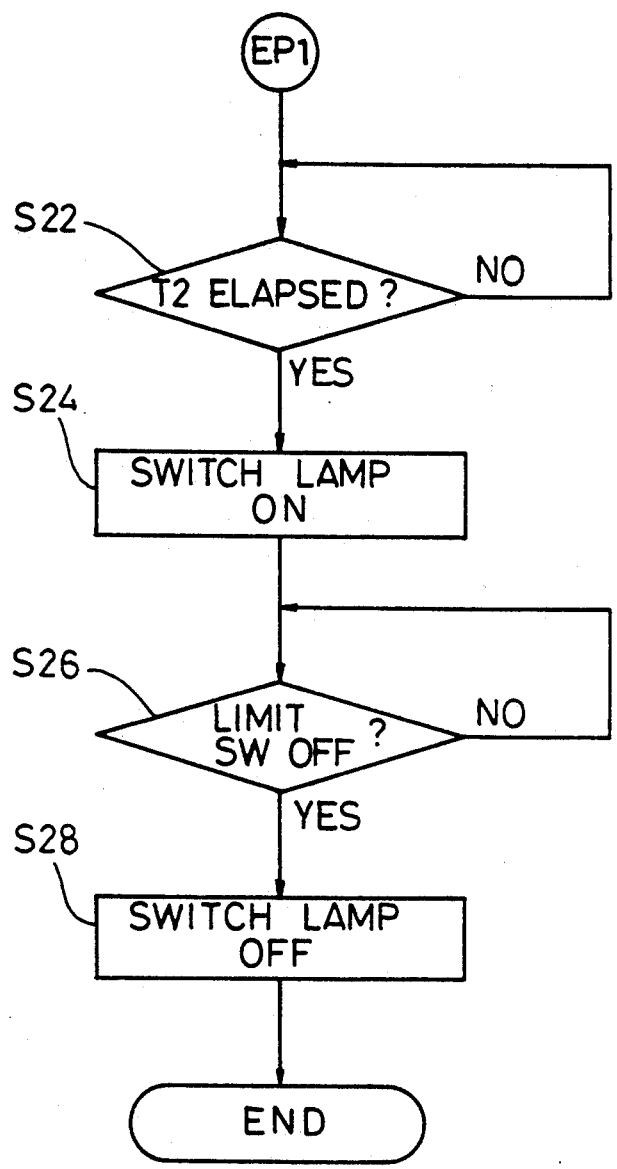

When the press arm 6 is lowered, the operation routine of the controller 92 shown in FIGS. 10 and 11 is ready to be started. More specifically, the controller 92 is held on stand-by before it receives the on-signal from the limit switch 108 (Step S100). When the press arm 6 descends to turn on the switch 108, therefore, the controller 92 activates the transformer 92, and energizes the primary coil 98 of the transformer 98 for a predetermined conduction time T1 (e.g., 1 sec). As a result, a large current flows through the secondary coil 100 of the transformer 96 (Step S120).

Figure 12:
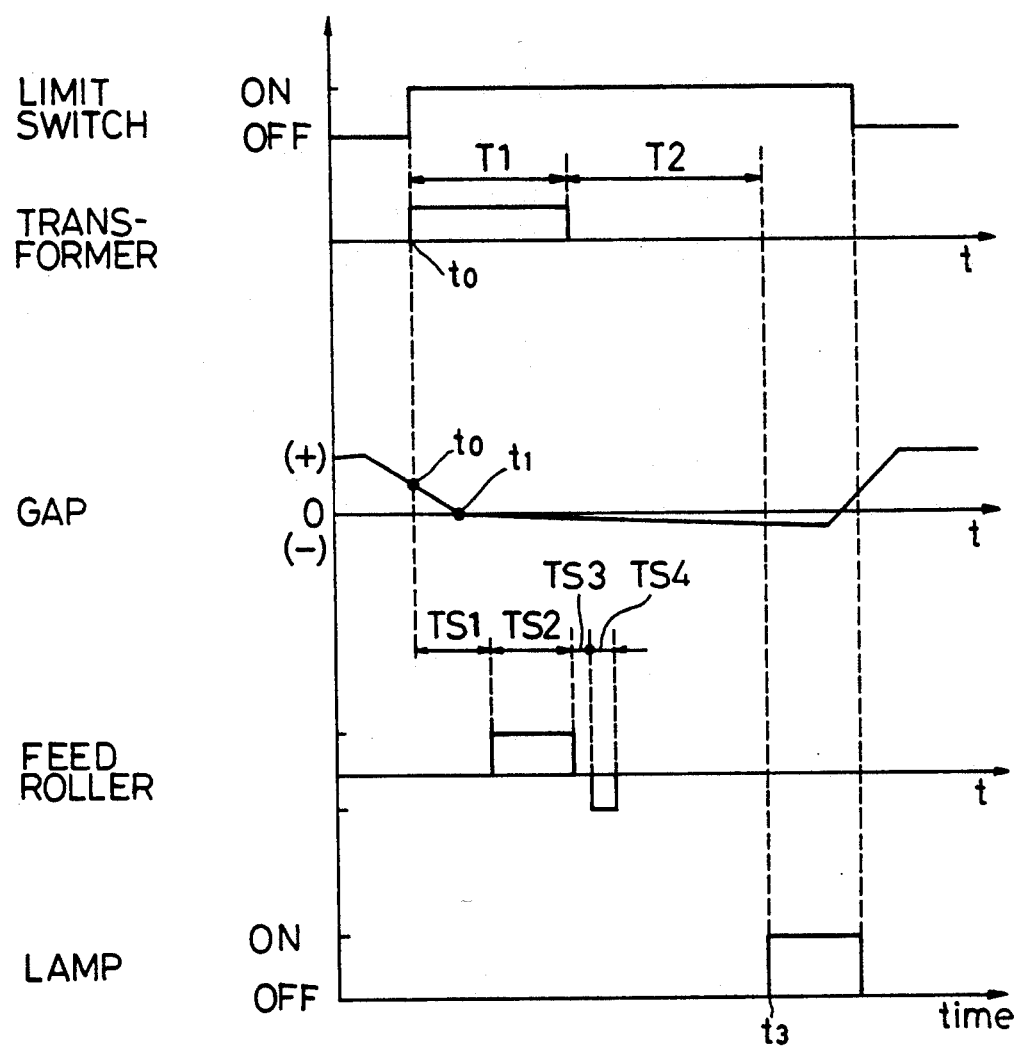
FIG. 12 is a time chart showing operating states of various elements or parts of the apparatus of FIG. 1.

The point of time for the activation of the transformation 96 is represented by t0 in FIG. 12. At this time point t0, a gap still remains between the first electrode rod 20 of the movable electrode unit 14 and the workpieces W1 and W2. At this point of time, therefore, the rod 20 is not electrically in contact with the workpieces W1 and W2, so that the large current produced in the secondary coil 100 of the transformer 96 flows through the feeder lines 102 and 104 to the first and second electrode rods 20 and 24 of the movable electrode unit 14.

Since the first and second electrode rods 20 and 24 are only in contact with each other, as mentioned before, the value of electrical resistance between the respective contact surfaces of the rods 20 and 24 are great.

Accordingly, a contact portion between the rods 20 and 24 suddenly generate heat due to the so-called contact resistance, so that the first electrode rod 20 is quickly heated. Here it is to be noted that the first electrode rod 20 is heated resisting the cooling thereof by the cooling water flowing in the water jacket 22.

When the movable electrode unit 14 is further lowered, the lower end face 34 of the first electrode rod 20 abuts against the workpiece W2, as shown in FIG. 9. This point of time is represented by t1 in FIG. 12. On and after the engagement between the first electrode rod 20 and the workpiece W2, that is, on and after time t1, the first electrode rod 20 and the fixed electrode rod 40 are connected electrically to each other by means of the workpieces W1 and W2, so that part of the large current supplied to the first and second electrode rods 20 and 24 flows through the fixed electrode rod 40 and the feeder line 106. Thereupon, the fixed electrode rod 40 generates heat due to its internal resistance. It is to be understood that the rod 40 is also heated resisting the cooling effect of the water jacket 42.

Thus, the workpieces W1 and W2 are heated by means of both the first electrode rod 20 and the fixed electrode rod 40. Since the first electrode rod 20 starts to generate heat at time t0, that is, before it comes into contact with the workpieces W1 and W2, the workpieces are quickly heated.

If the operator goes on working the pedal 76 on and after time t1, the force to lower the drive column 56 is transmitted to the press arm 6 through the second supporting spring 90. Since the urging force of the second supporting spring 90 is greater than that of the first supporting spring 62, the arm 6 is pressed downward by the spring 90. In this manner, the workpieces W1 and W2 held between the first and fixed electrode rods 20 and 40 are pressurized. Pressure applied to the workpieces W1 and W2 increases before the flange 60 of the drive column 56 engages the stopper 82. Thus, the maximum applied pressure on the workpieces W1 and W2 can be adjusted depending on the types or sizes of the workpieces by means of the cap nut 86 and the stopper 82. For example, the maximum applied pressure may range from 2 to 10 kgf. In this embodiment, it is adjusted to 6 kgf.

The controller 92 determines whether or not a predetermined time TS1 (e.g., 0.5 sec) has elapsed after the time t0 for the activation of the limit switch 108, and is held on stand-by until the result of this decision becomes YES (Step S14). When the predetermined time TS1 elapses, the controller 92 delivers a solder feed signal to the feeding device 112 (Step S16).

On receiving the feed signal, the feeding device 112 automatically executes a series of operations, as shown in FIG. 12. More specifically, the feed roller 122 of the device 112 is rotated forward for a predetermined supply time TS2 (e.g., 0.5 sec). The forward rotation of the roller 122 causes the solder 120 to be paid out from the reel 118, whereby a predetermined amount of the solder 120 is guided by the guide tube 126 to be fed toward the heated workpieces W1 and W2. While being melted by heat, the solder 120 tramsfers to the workpieces W1 and W2, and is delivered to those parts of the workpieces which are held between the fixed electrode rod 40 and the first electrode rod 20.

After the lapse of the supply time TS2, the feed roller 122 is rotated reversely for a predetermined return time TS4 (e.g., 0.2 sec) with an interposition of a predetermined rest time TS3 (e.g., 0.1 sec). When the roller 122 starts to rotate reversely, the leading end of the solder 120 is separated from the workpieces W1 and W2. Depending on the types of the workpieces W1 and W2 used, the reverse rotation of the feed roller 122 may be omitted.

In the aforementioned operation of the feeding device 112, as seen from FIG. 12, the supply of the solder 120 ends at the same time with the current supply to the transformer 96. However, these operations need not always be finished at the same time.

While controlling the operation of the feeding device 112, the controller 92 also determines whether or not the conduction time T1 has elapsed (Step S18). When the result of this decision becomes YES, the current supply to the transformer 96 ends (Step S20). At this point of time, therefore, the first and second electrode rods 20 and 24 and the fixed electrode rod 40 cease to generate heat, that is, the workpieces W1 and W2 cease to be heated.

Thereafter, the controller 92 determines whether or not a predetermined cooling time T2 has elapsed after the lapse of the conduction time T1, and is held on stand-by until the result of this decision becomes YES (Step S22). The cooling time T2 is adjusted to a period of time (e.g., 1 sec) required for the solder on the workpieces W1 and W2 to solidify fully. Thus, when the first and second electrode rods 20 and 24 and the fixed electrode rod 40 cease to generate heat, these electrodes, and hence, the solder on the workpieces W1 and W2, are rapidly cooled by means of the cooling water flowing in the water jackets 22, 26 and 44, so that the solder solidifies.

When the cooling time T2 elapses, the controller 92 turns on the lamp 110 (Step S24), thereby notifying the operator of the end of the solder cooling. Thereafter, the controller 92 is held on stand-by until the limit switch 108 is turned off (Step S26) and the controller 92 receives an off-signal from the limit switch 108.

Thus, when the operator, noticing the lighting lamp 110, removes his or her foot from the pedal 76, the drive column 56 is raised by the restoring force of the tension spring 72, so that the press arm 6 returns to its original position or up position. Since the force transmitted from the column 56 to the first and second supporting springs 62 and 90 is then also removed, the arm 6 returns to a predetermined position with respect to the axial direction of the drive column 56.

When the limit switch 108 is turned off while the press arm 6 is returning to the up position, the controller 92 turns off the lamp 110 in response to the off-signal from the switch 108.

In the soldering work described above, the first electrode rod 20 of the movable electrode unit 14 generates heat on the basis of a great contact resistance between the first and second electrode rods 20 and 24. Since the first rod 24 is heated before it touches the workpieces W1 and W2, moreover, the workpieces can be heated to a predetermined temperature in a short period of time. Thus, the time required for the heating of the workpieces W1 and W2 is shortened, so that the time for each cycle of soldering operation can be reduced.

After the first electrode rod 20 is brought into contact with the workpieces W1 and W2, the fixed electrode rod 40 also generates heat, so that the workpieces W1 and W2 are heated also by means of the rod 40. Thus, the workpieces W1 and W2 can be uniformly heated, whereupon the solder can be satisfactorily melted, and the molten solder can be uniformly supplied to those portions of the workpieces W1 and W2 to be soldered.

Thereafter, the molten solder is rapidly solidified as the workpieces W1 and W2 are cooled by means of the electrode rods 20, 24 and 40, so that the time required for the solidification of the solder is shortened, and the tact time is further reduced.

Before the solder solidifies, the workpieces W1 and W2 are held between the first electrode rod 20 and the fixed electrode rod 40, so that they cannot be dislocated with respect to each other. Therefore, the solder can be prevented from becoming lumpy as it solidifies, or from adhering to only one of the workpieces. Thus, the soldering can be effected without defects.

Since the electrode rods 20, 24 and 40 are formed of material which is reluctant to be wetted by solder, moreover, the solder 120, which is supplied directly to the workpieces W1 and W2, never adheres to the electrode rods. Accordingly, the amount of solder supply to the workpieces W1 and W2 is fixed, and the external shape of soldered portions is uniform.

Since the workpieces W1 and W2 are both heated and pressurized during the soldering work, the solder diffuses deep into the base materials of the workpieces, so that the bonding strength of the soldered portion can be increased.

While the soldering apparatus is performing a series of operations, the operator is expected only to locate the workpieces W1 and W2 on the fixed electrode rod 40 and hold the workpieces only before they are held between the fixed electrode rod 40 and the first electrode rod 20. Thus, the operator requires no special skill.

Usually, a flux is inevitably used in the soldering work, but the flux is electrically non-conductive in the dry condition. In the case where the movable electrode unit 14 has the first electrode rod 20 only and the workpieces W1 and W2 are previously coated with the flux, therefore, when the soldering work are repeated, the non-conductive layer is formed on the lower end face of the small-diameter portion 32 of the first electrode 20 by drying the flux adhered on the lower end face of the small-diameter portion 32. The non-conductive layer formed in this manner serves to prevent current supply to the first and fixed electrode rods 20 and 40 when the workpieces W1 and W2 are held between the electrode rods 20 and 40. Therefore, the rods 20 and 40 cannot generate sufficient heat, that is, the workpieces W1 and W2 cannot be satisfactorily heated. Moreover, in the case where the conductive area between the first and fixed electrode rods 20 and 40 is decreased by the non-conductive layer, sparks are caused between the first electrode rod 20 and the workpieces, so that the soldering work itself may not be performed.

In the soldering apparatus according to this embodiment, however, the movable electrode unit 14 is provided with the first and second electrode rods 20 and 24 which are in contact with each other, so that the first electrode rod 20 can generate heat by means of contact resistance even before it comes into contact with the workpieces W1 and W2. Since the rod 20 is previously heated, therefore, the flux adhered on the small-diameter portion 32 of the first electrode rod 20 can be removed by heating, and the heating of the workpieces W1 and W2 and the soldering work do not be subjected to the adverse effect due to the flux.

Figure 13:
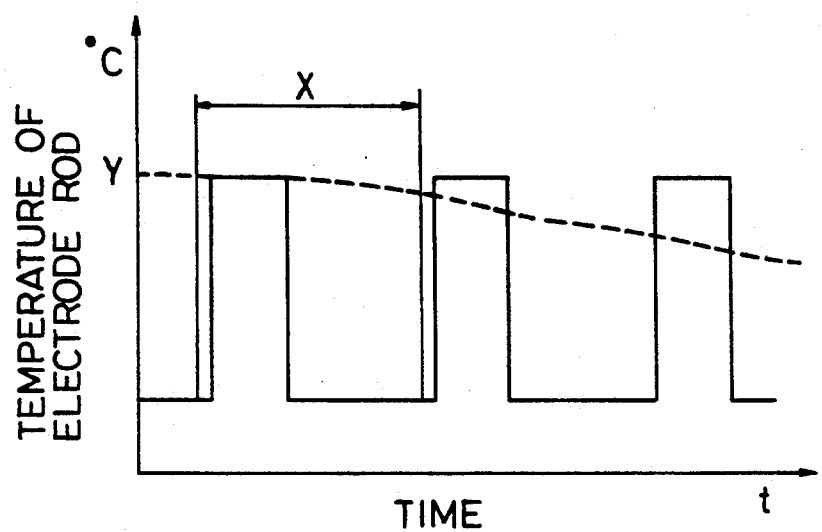
FIG. 13 is a graph schematically showing a transition of temperature of each electrode rod for each work cycle in the apparatus of FIG. 1.

A temperature transition of each electrode rod 20, 24 or 40 is diagrammatically represented by full line in FIG. 13. This transition is obtained when the workpieces W1 and W2 are repeatedly soldered. In FIG. 13, symbol X designates one cycle of soldering operation. In the soldering apparatus of this embodiment, heat generation of the electrode rods 20, 24 and 40 and the cooling are executed during one cycle of soldering operation. During each cycle, therefore, the exothermic temperature of the first electrode rod 20, for example, can be stably reproduced at a fixed value Y by setting the conduction time T1 for the current supply to the electrode rod 20. The exothermic temperature Y can be adjusted by changing the conduction time T1. When using a soldering iron for the soldering work, however, the next cycle of soldering operation may be executed before the temperature of the iron reaches a predetermined level if the tact time is too short. In consequence, the temperature of the soldering iron gradually drops, as indicated by broken line in FIG. 13, probably entailing defective soldering. Thus, with use of the soldering iron, the most skilled operator cannot make the tact time short enough.

In the embodiment described above, the feeding device 112 is used to supply the solder to the workpieces W1 and W2. However, the feeding device 112 may be omitted if the solder is previously adhered to the workpieces W1 and W2 by dip coating.

The conductive heat generation of the first electrode rod 20 need not always be started at time t0 of FIG. 12, and may be started at t1 instead.

Figure 14:
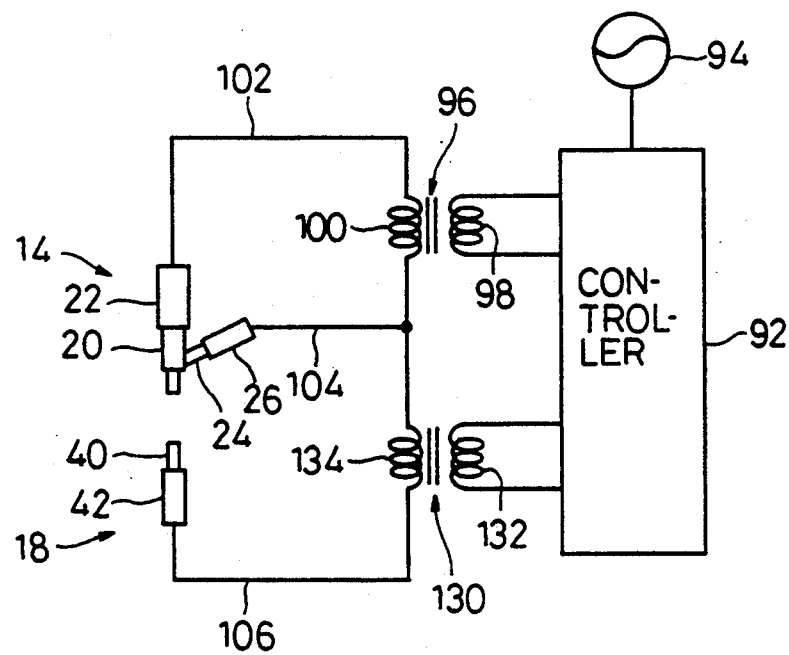
FIG. 14 is a diagram showing a modification of the control circuit of FIG. 8.

In the embodiment described above, the electrode rods 20, 24 and 40 are supplied with current from the common transformer 96, as shown in FIG. 8. In a circuit shown in FIG. 14, however, a second transformer 130 is provided besides the transformer 96. A primary coil 132 of the first transformer 130 is connected to the controller 92, while its secondary coil 134 is provided in the middle of the feeder line 106.

With use of these two transformers 96 and 130, the controller 92 can separately control the current flowing between the first and second electrode rods 20 and 24 and the current flowing between the first electrode rod 20 and the fixed electrode rod 40 through the workpieces W1 and W2. Thus, if the workpieces W1 and W2 are different in thermal capacity, the workpieces W1 and W2 can be heated by means of the first electrode rod 20, and besides, the workpiece W2 can be additionally heated by means of the fixed electrode rod 40.

Figure 15:
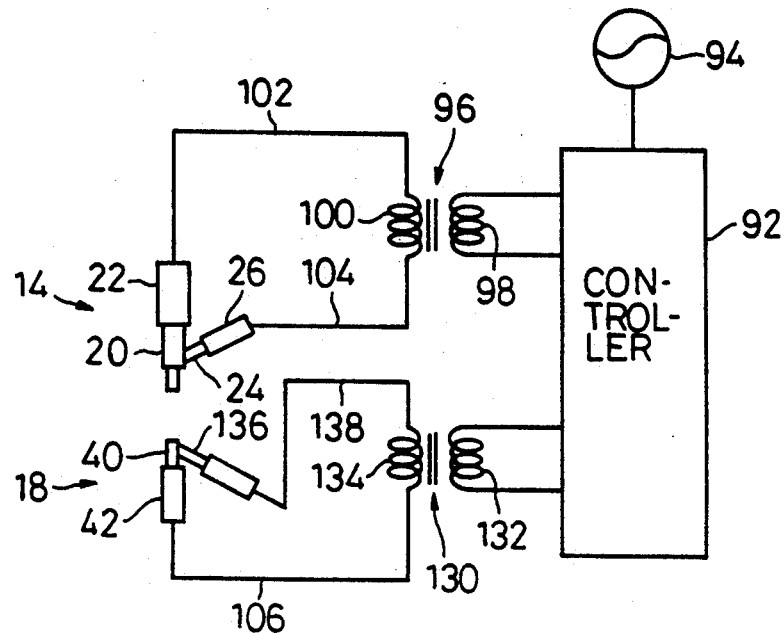
FIG. 15 is a diagram showing another modification of the control circuit.

If the thermal capacity of the workpiece W2 is very large, the fixed electrode unit 18 shown in FIG. 15 may be used. This unit 18 includes not only the fixed electrode rod 40 but also a second electrode rod 136 in contact with the rod 40. Further, the controller 92 is connected with the second transformer 130 as well as the first transformer 96. One end of the secondary coil 134 of the second transformer 130 is connected to the fixed electrode rod 40 by means of the feeder line 106. The other end of the secondary coil 134 is connected to the second electrode rod 136 by means of a feeder line 138. As seen from FIG. 15, therefore, the movable electrode unit 14 and the fixed electrode unit 18 have their respective power supply circuits independent of each other. If the fixed electrode unit 18, like the movable electrode unit 14, is provided with the fixed electrode rod 40 and the second electrode rod 136 in contact with each other, as described above, these two rods 40 and 136 can rapidly generate heat based on contact resistance. In this case, moreover, the respective heat values of the movable and fixed electrode units 14 and 18 can be separately controlled.

Figure 16:
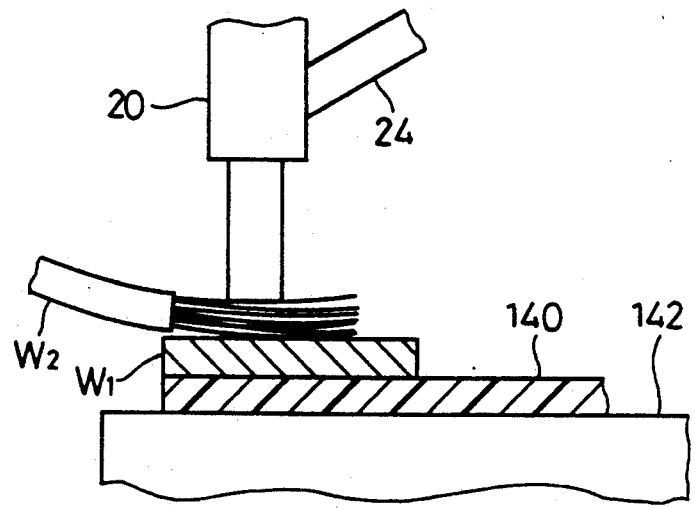
FIG. 16 is a view showing a combination of workpieces different from the one shown in FIG. 9.

According to the soldering apparatus of this embodiment, the workpieces W1 and W2 can be soldered even if the workpiece W1 is previously mounted on a plastic base plate 140, that is, if the non-conductive plate 140 is interposed between the first electrode rod 20 and the fixed electrode rod 40, as shown in FIG. 16. Thus, even though the first electrode rod 20 is not connected electrically to the fixed electrode rod 40 through the workpieces W1 and W2, it can generate heat only if the first and second electrode rods 20 and 24 are supplied with current. Accordingly, the workpieces W1 and W2 can be soldered by being heated by means of the first electrode rod 20 only.

When these workpieces W1 and W2 are handled, therefore, the fixed electrode rod 40 need not be used. Instead of using the rod 40, it is necessary only to provide a rest 142 which is used only to support the workpieces W1 and W2 through the medium of the base plate 140, as shown in FIG. 16.

In this embodiment, the drive column 56 or the movable electrode unit 14 descends when the pedal 76 is worked, as shown in FIG. 7. Alternatively, however, the column 56 may be lowered by means of an air cylinder 144 indicated by two-dot chain line in FIG. 7, without working the pedal 76. A piston rod 146 of the cylinder 144 is connected to the other end of the lever 64, so that the drive column 56 can be lowered by means of the lever 64 when the piston rod 146 of the cylinder 144 is extended.

Figure 17:
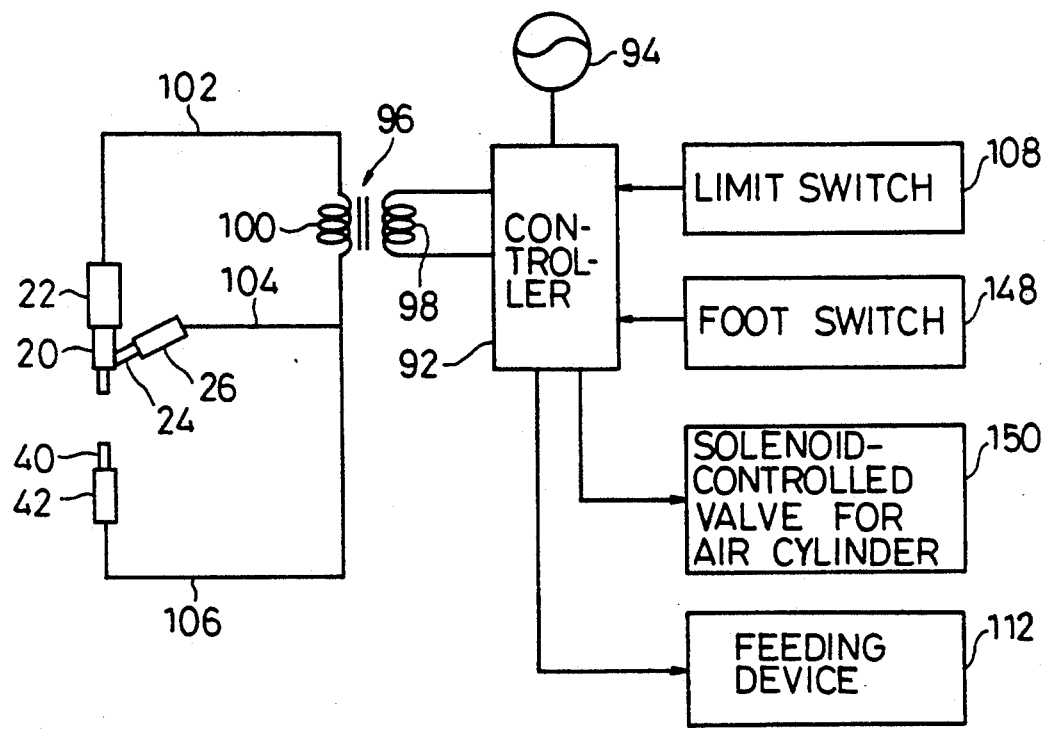
FIG. 17 is a diagram showing a control circuit in which an air cylinder is used as the drive mechanism for the movable electrode unit.

If the air cylinder 144 is used to lower the drive column 56, the control circuit of FIG. 8 can be replaced with a control circuit shown in FIG. 17. In the control circuit of FIG. 17, a foot switch 148 and a solenoid-controlled valve 150 for the air cylinder 144 are used in place of the lamp 110 of FIG. 8. The switch 148 and the valve 150 are connected to the controller 92. The valve 150, which is interposed between the air cylinder 144 and a source of air pressure (not shown), controls the supply and discharge of air pressure to and from the cylinder 144.

According to the control circuit of FIG. 17, if the operator turns on the foot switch 148, the controller 92 switches the solenoid-controlled valve 150 to an air pressure supply position, so that air pressure from the air pressure source is supplied to the air cylinder 144. Thus, when the foot switch 148 is turned on, the drive column 56 or the movable electrode unit 14 starts to descend. Thereafter, the controller 92 controls the operation of the transformer 92 and the feeding device 112 in the aforesaid manner. When the soldering work on the workpieces W1 and W2 is finished at the end of the cooling time T2, the controller 92 switches the valve 150 to an air pressure discharge position. As a result, the drive column 56 or the movable electrode unit 14 rises and returns to its original position or up position, whereupon one cycle of soldering operation is completed.

With use of the control circuit described above, the operator can activate the soldering apparatus by only turning on the foot switch 148, so that the operator's labor can be saved.

Although the movable electrode unit 14 is lowered in the embodiment described above, it may alternatively be raised toward the fixed electrode unit 18. In this case, the respective vertical positions of the movable and fixed electrode units 14 and 18 are in opposite relation.

Further, an automatic workpiece soldering system can be obtained by combining the soldering apparatus of this embodiment with an automatic workpiece transportation apparatus. In this case, the soldering apparatus is provided with a sensor for detecting the feed and positioning of the workpieces W1 and W2 onto the fixed electrode unit 18 by means of the workpiece transportation apparatus. On receiving a signal from this sensor, the soldering apparatus starts its operation.

Figure 18:
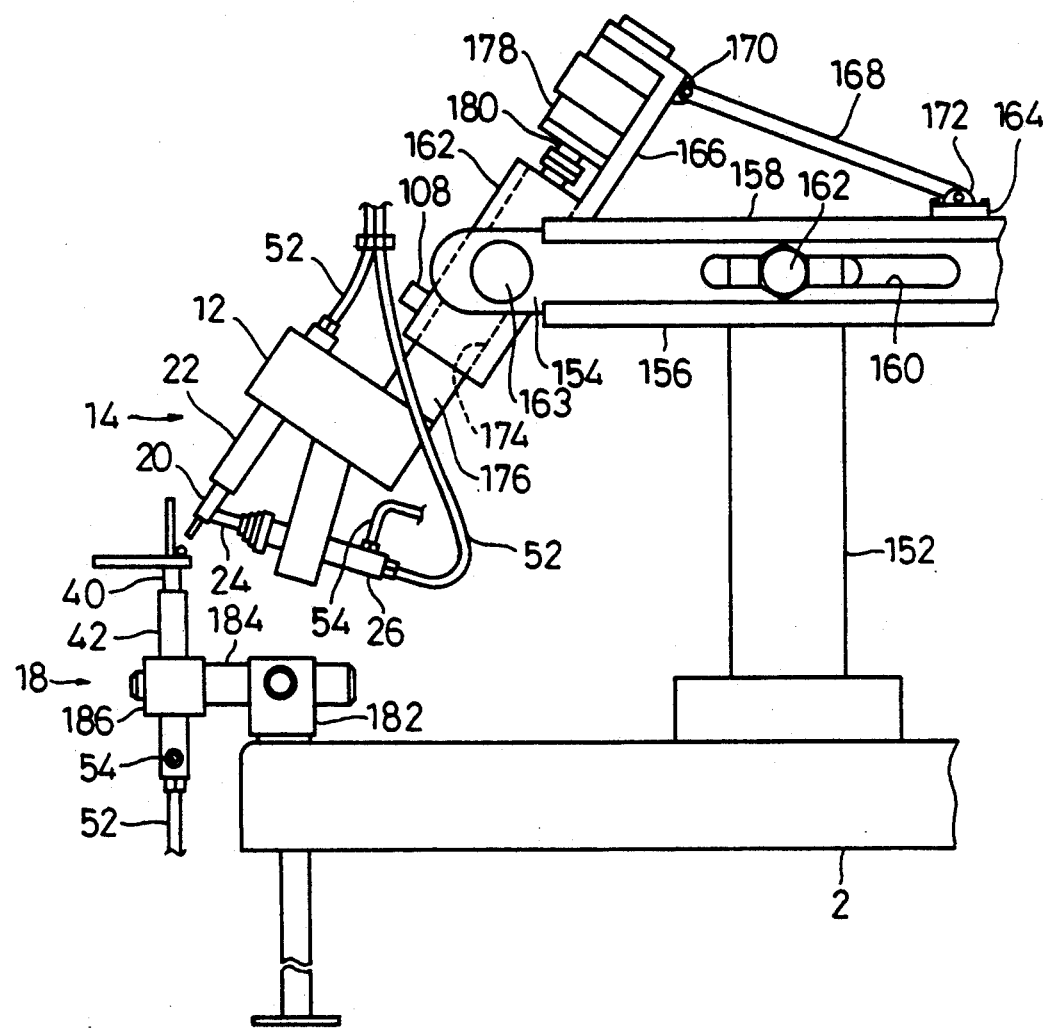
FIG. 18 is a side view showing a soldering apparatus according to a second embodiment.
Figure 19:
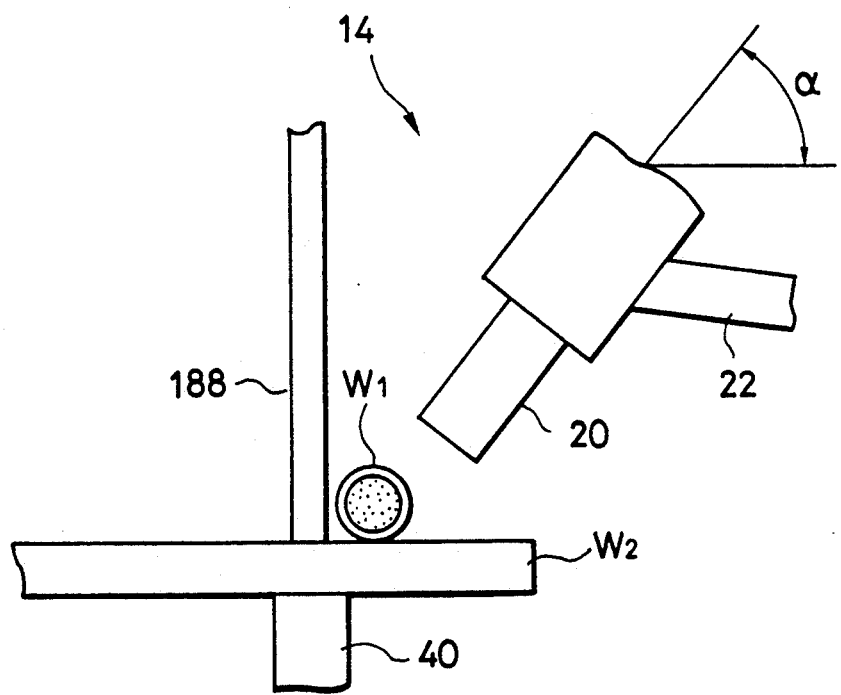
FIG. 19 is an enlarged view showing part of the apparatus of FIG. 18.

Referring now to FIGS. 18 and 19, there is shown in a soldering apparatus according to a second embodiment of the present invention. In the following description of the apparatus of the second embodiment, like reference numerals are used to designate like members with the same functions as have been described in connection with the first embodiment, and a detailed description of those members is omitted.

In the second embodiment, a support post 152 in the form of a plate is set up on a base 2. A pair of support beams 154 are mounted on the upper portion of the support post 152 so as to be situated at a predetermined height and to hold the post 152 between them. The beams 154, which horizontally extend facing each other, are mounted on the support post 152 for horizontal movement. More specifically, a pair of guide rails 156 and 158, lower and upper, are fixed to either side face of the post 152. The rails 156 and 158 serve to guide the horizontal movement of the support beams 154 and support the beams. Each support beam 154 has a guide hole 160 extending in the longitudinal direction thereof. Thus, the support beams 154 are fixed to the support post 152 after being located at a predetermined position with respect to the horizontal direction by means of a fixing bolt 162 which penetrates the respective guide holes 160 of the beams 154 and the post 152.

A unit guide 162 in the form of a rectangular block is attached to the respective distal end portions of the support beams 154 by means of a horizontal shaft 163. The guide 162 is rotatable around the shaft 163 so that its tilt angle with respect to a horizontal plane can be adjusted.

The tilt angle of the unit guide 162 may be adjusted by using various means, such as means for varying the angle by stages and means for steplessly varying the angle. The means shown in FIG. 18 includes a movable plate 164, which is disposed spanning the two upper guide rails 158. The plate 164 is movable on the rails 158 in the longitudinal direction of the support beams 154. A portion 166 extends from the upper end of the unit guide 162, and it is connected to the movable plate 164 by means of a support rod 168. The opposite ends of the rod 168 are rockably mounted on an end portion of the extended portion 166 and the plate 164 by means of brackets 170 and 172, individually. Thus, in the mechanism according to the second embodiment, the tilt angle of the unit guide 162 can be steplessly adjusted by regulating the position of the movable plate 164.

A guide hole 174 penetrates the unit guide 162 in the axial direction thereof, and a guide rod 176 is passed through the hole 174. The lower and upper ends of the rod 176 are connected to the movable electrode unit 14 and a piston rod 180 of an air cylinder 178. The air cylinder 178, unlike the aforementioned air cylinder 144, is of a type containing a return spring (not shown) therein, and is fixed to the extended portion 166 of the unit guide 162. Thus, when the piston rod 180 of the cylinder 178 is extended, the movable electrode unit 14 can diagonally descend toward the fixed electrode unit 18.

In the second embodiment, the support 16 of the fixed electrode unit 18 includes a clamp 182 fixed on the base 2, a support rod 184 attached to the clamp 182, and a holder 186 mounted on the distal end of the rod 184 and holding the fixed electrode rod 40 with the aid of the water jacket 42.

According to the soldering apparatus of the second embodiment described above, the tilt angle of the movable electrode unit 14 is adjusted depending on the shapes of workpieces W1 and W2 to be soldered. In soldering a workpiece W1 to a workpiece W2 having a pin 188 protruding upward therefrom, as shown in FIG. 19, the tilt angle α of the unit 14 or the first electrode rod 20 is set so that the workpieces W1 and W2 can be held between the first electrode rod 20 and the fixed electrode rod 40 without interfering with the pin 188 of the workpiece W2. Thus, when the piston rod 180 of the air cylinder 178 is extended thereafter, the movable electrode unit 14 or the first electrode rod 20 diagonally descends toward the fixed electrode rod 40, and the workpieces W1 and W2 are held between the rods 20 and 40 as they are soldered together. The operation of the soldering apparatus of the second embodiment is controlled by means of the control circuit shown in FIG. 17. In this case, the solenoid-operated valve 150 controls the supply and discharge of air pressure to and from the air cylinder 178.

Since the soldering apparatus of the second embodiment is less susceptible to restrictions on the workpiece shape, it is higher in flexibility in use than the apparatus of the first embodiment.

If the movable electrode unit 14 of each of the soldering apparatuses according to the first and second embodiments is attached to a robot hand, moreover, workpieces located at a plurality of soldering positions can be continuously soldered by program-controlling the movement of the robot hand.

Figure 20:
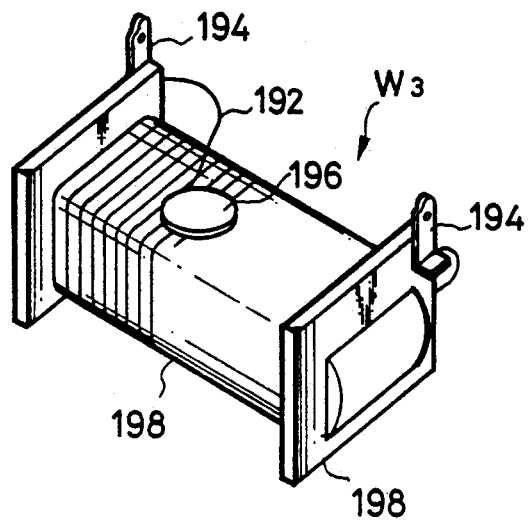
FIGS. 20 and 21 are perspective views each showing a bobbin wound with a lead wire for use for as a workpiece.
Figure 21:
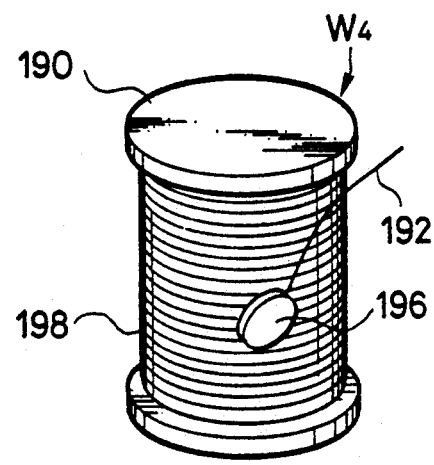

The present invention is not limited to the soldering apparatuses according to the first and second embodiments, and may be also applied to any other connection work than the soldering work. Referring now to FIGs. 20 and 21, for example, there are shown workpieces W3 and W4 which are different from the workpieces W1 and W2 described above. These workpieces W3 and W4 are electric components which are each composed of a bobbin 190 wound with a covered lead wire. In the one workpiece W3, opposite end portions 192 of the lead wire are soldered individually to a pair of terminals 194 fixed to the bobbin 190. In the other workpiece W4, one end portion 192 of the covered lead wire is free.

In the workpieces W3 and W4 of this type, the end portions 192 of the covered lead wire are liable to be disengaged from the bobbin 190, so that they are preferably bonded to a turn portion 198 of the lead wire by means of an adhesive 196 formed of a hot melt resin, as shown in FIGS. 20 and 21.

Figure 22:
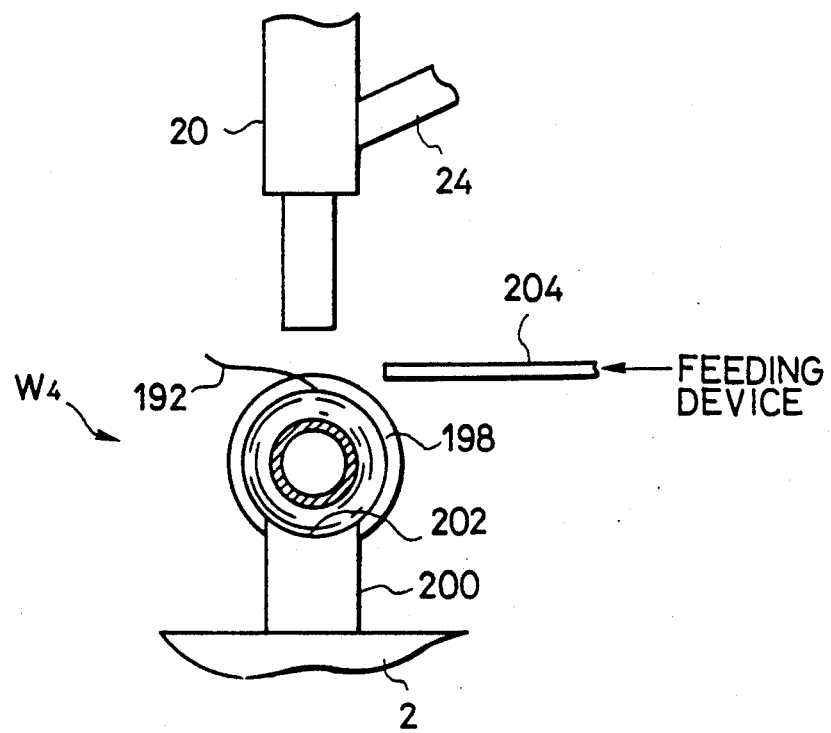
FIG. 22 is a view showing part of an apparatus according to a third embodiment in which a bobbin is treated as a workpiece.

The apparatus of the present invention can be also easily applied to the aforesaid bonding work for the end portion 192 of the covered lead wire. Referring to FIG. 22, there is shown an apparatus according to a third embodiment which is suited for the bonding work. This apparatus is of the same type as the one shown in FIG. 16. More specifically, the apparatus of the third embodiment uses a workpiece rest 200 having a rod-shape in place of the fixed electrode rod 40. The upper end of the rest 200 is in the form of an arcuate surface 202 such that it can stably receive the turn portion 198 of the workpiece W4. The apparatus of the third embodiment, unlike the apparatus of the first embodiment, is provided with a feeding device for supplying an adhesive ribbon 204 formed of a hot-melt resin, in place of the solder feeding device 112. The feeding device of this third embodiment, which is not illustrated because of its basically same construction as that of the foregoing feeding device 112, includes a reel wound with the adhesive ribbon 204. The adhesive ribbon 204 can be supplied from the reel to the workpiece W4 on the rest 200. Polyamide, EVA (ethylene-vinyl copolymer), or a hot-melt resin obtained by adding a plasticizer to nylon 12 may be suitably used as the adhesive.

According to the apparatus of the third embodiment, the workpiece W4 is first placed and retained on the rest 200. At this time, the end portion 193 of the covered lead wire is situated so that it can be held between the turn portion 198 of the workpiece W4 and the movable electrode unit 14 or the first electrode rod 20. In this state, the leading end portion of the adhesive ribbon 204 is fed onto the workpiece W4, and is situated so that the end portion 192 of the lead wire of the workpiece W4 can be held between the leading end portion of the ribbon 204 and the turn portion 198 of the workpiece W4.

Figure 23:
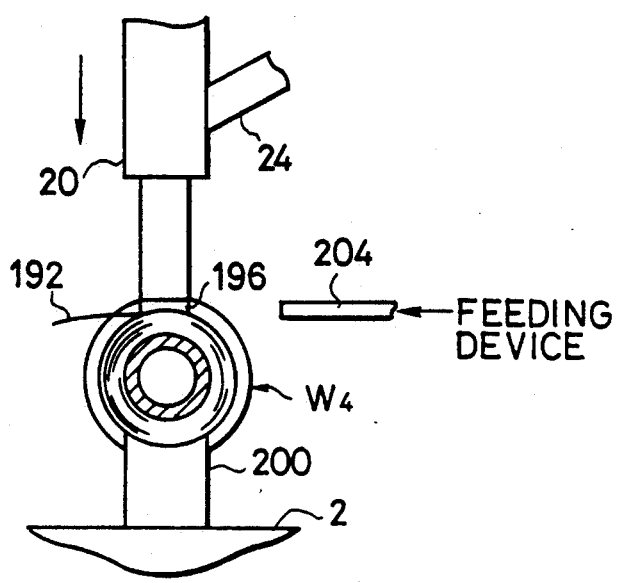
FIG. 23 is a view showing an operating state of the apparatus of FIG. 22.

Thereafter, the first electrode rod 20 is lowered so that the end portion 192 of the covered lead wire and the leading end portion of the adhesive ribbon 204 are held between the lower end of the first electrode rod 20 and the turn portion 198 of the workpiece W4. At this point of time, current is supplied to the first electrode rod 20 and the second electrode rod 24, so that the first rod 20 rapidly generates heat. As a result, the leading end portion of the adhesive ribbon 204 is heated and melted. The moment this is done, the ribbon 204 is wound up on the reel of the feeding device, so that a predetermined amount of adhesive 196 is left on the turn portion 198 of the workpiece W4, as shown in FIG. 23. Since the leading end portion of the adhesive ribbon 204, at this time, is pressed against the turn portion 198 of the workpiece W4 by means of the first electrode rod 20, the ribbon 204 can be cut in a satisfactory manner. The first electrode rod 20 may alternatively be cause to generate heat before it comes into contact with the leading end portion of the adhesive ribbon 204.

After a predetermined time of the generation of heat of the first electrode rod 20 or the heating of the adhesive 196, the current supply to the first and second electrode rods 20 and 24 is stopped. Thereafter, the rods 20 and 24 are cooled by means of cooling water in their respective water jackets 22 and 24 for a predetermined cooling time, whereby the melted adhesive 196 is quickly solidified. When the first electrode rod 20 is raised, thereafter, the end portion 192 of the covered lead wire is fixed to the turn portion 198 of the workpiece W4 by means of the adhesive 196.

Figure 24:
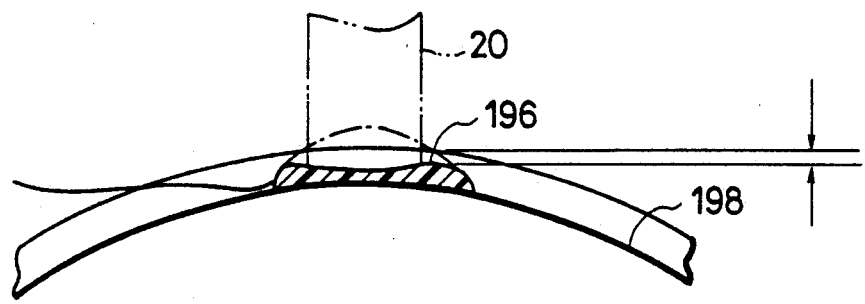
FIG. 24 is an enlarged view showing a state in which a lead wire of the bobbin is fixed to a turn portion of the bobbin by means of the apparatus of FIG. 22 using a hot-melt resin.

Since the adhesive 196 is quickly solidified by compulsorily cooling the first electrode rod 20 after it is instantaneously melted by means of heat from the rod 20, the end portion 192 of the covered lead wire can be bonded in a short period of time. Since the adhesive 196 is pressed by the first electrode rod 20, moreover, the end portion 192 of the lead wire can be securely bonded to the turn portion 198 of the workpiece W4. At this time, furthermore, the adhesive 196 adheres in a flat form to the workpiece W4, as indicated by full line in FIG. 24. Thus, the adhesive 196 is prevented from swelling out from end flanges of the workpiece W4, as indicated by dashed line in FIG. 24.

Figure 25:
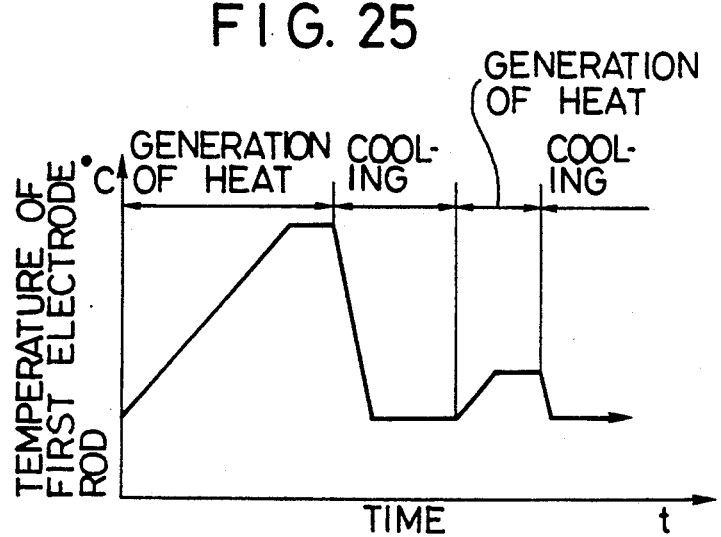
FIG. 25 is a graph showing a transition of temperature of a first electrode rod in the apparatus of FIG. 22 for each work cycle.

If part of the adhesive 196 adheres to the first electrode rod 20 as the rod 20 is separated from the adhesive, the rod 20 may be caused again to generate heat for a short period of time immediately before it is raised after being cooled, as shown in FIG. 25. Thus, current is supplied to the first and second electrode rods 20 and 24 in two stages. By doing this, the first electrode rod 20 can be properly disengaged from the adhesive 196 without causing it to adhere to the rod 20 by melting only the outer surface portion of the adhesive 196. In causing the first electrode rod 20 again to generate heat, the adhesive 196 should not be melted so much that it threads as the rod 20 ascends.

Figure 26:
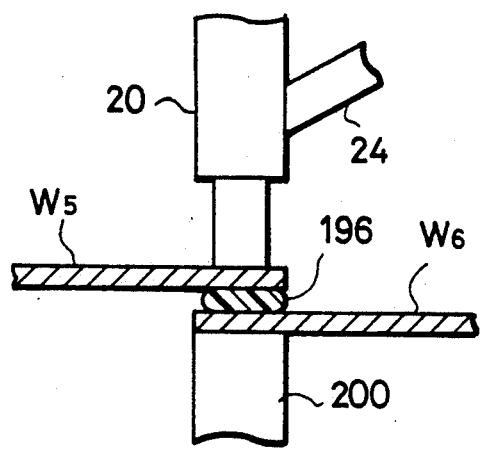
FIG. 26 is a view showing alternative workpieces bonded by means of the apparatus of FIG. 22 using a hot-melt resin.

The apparatus of the third embodiment is not limited to the use with the workpieces W3 and W4, and may be also used to bond workpieces W5 and W6, each in the form of a metal plate, by means of a hot-melt resin 196, as shown in FIG. 26. Preferably, in this case, the upper end face of the rest 200 is flat. The hot-melt resin 196 may be omitted if the workpieces W5 and W6 are formed of an adhesive resin.

Further, the apparatus of the third embodiment may be also applied to the fields in which workpieces are conventionally bonded by means of instantaneous adhesives, e.g., bonding between the top and bottom portions of a chemical shoes, bonding of speaker cones, etc. In this case, the apparatus can enjoy a wider range of application if it is of a compact or handy type.

Figure 27:
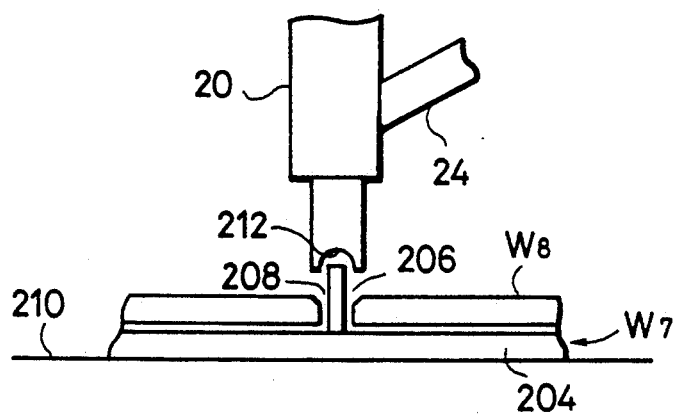
FIG. 27 is a view showing a first electrode rod suited for use with workpieces to be hot-caulked.

The apparatus of the present invention may be also applied to hot caulking of workpieces. One such workpiece W7 includes a thermoplastic base plate 204 and a pin 206 protruding integrally from the back of the plate 206, as shown in FIG. 27. A workpiece W8 to be fitted with the workpiece W7 is in the form of a plate having a hole 208 through which the pin 206 can be passed. These workpieces W7 and W8 are joined together in a manner such that the pin 206 of the workpiece W7 penetrates the hole 208 of the workpiece W8. In this state, the workpieces W7 and W8 are placed on the base 2 of the apparatus or on a support block 210 which is disposed on the base 2. At this time, the pin 206 protruding from the workpiece W8 is situated so as to face the lower end face of the first electrode rod 20. In this embodiment, the lower end face of the rod 20 is in the form of a hemispherical concave surface 212. When the first electrode rod 20, caused to generate heat by the current supply, is lowered in this state, the distal end of the pin 206 is squeezed along the shape of the concave surface 208 or the lower end face of the rod 20 as it is heated to be melted by means of the rod 20. Thereafter, the first electrode rod 20 is cooled by means of the cooling water, so that the melted distal end portion of the pin 206 is quickly solidified. In this manner, the pin 206 is fixed to the workpiece W8 by caulking, and the first electrode rod 20 is raised.

Figure 28:
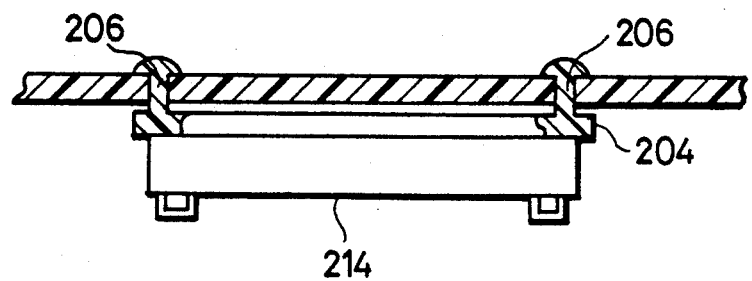
FIG. 28 is a sectional view showing hot-caulked workpieces.

FIG. 28 shows specific examples of the workpieces W7 and W8. In this case, the workpiece W7 is composed of a base plate 204, a large number of electric circuit elements (not shown) mounted on the base plate 204, and a resin mold 212 covering the circuit elements. On the other hand, the workpiece W8 is composed of a printed board, which has a circuit pattern connected electrically to the workpiece W7.

The apparatus of the present invention is can perform hot-caulking work even on narrow areas of the printed board in consideration of the shape and size of the first electrode rod 20.

Figure 29:
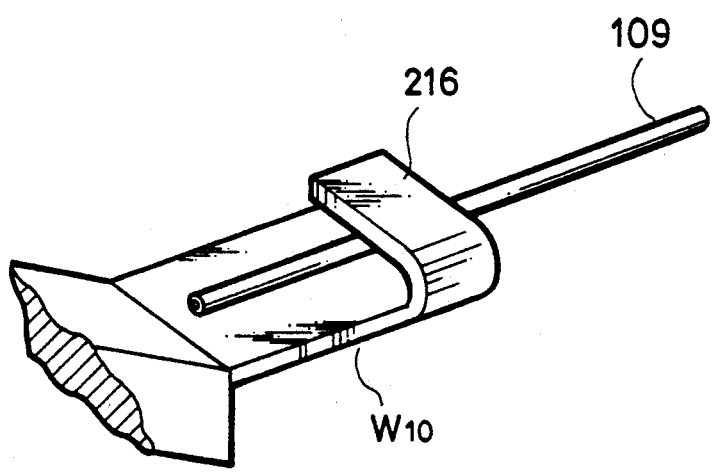
FIG. 29 is a perspective view showing a combination of a terminal and a covered lead wire for use as workpieces.

Referring now to FIG. 29, there are shown a covered lead wire W9 for use as a workpiece and a terminal W10 to which the wire W9 is connected electrically. The terminal W10 includes a nipping piece 216 for nipping the lead wire W9.

Figure 30:
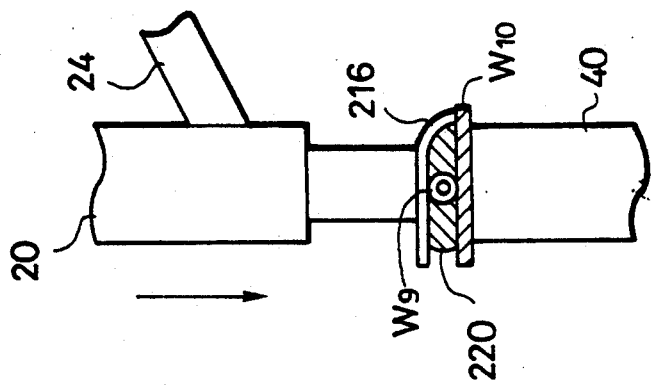
FIGS. 30 to 33 are views showing processes of connection between the terminal and the covered lead wire of FIG. 29 by means of the apparatus of FIG. 1.

The apparatus of the present invention can mechanically connect the covered lead wire W9 to the terminal W10 by bending the nipping piece 216 of the terminal W10, and at the same time, electrically connect the covered lead wire W9 and the terminal W10 by using the solder. Referring to FIGS. 30 to 33, there are shown processes of operation for mechanically and electrically connecting the covered lead wire W9 and the terminal W10. First, the lead wire W9 and the terminal W10 are placed overlapping each other on the fixed electrode rod 40, as shown in FIG. 30. In this state, the nipping piece 216 of the terminal W10 is open.

Figure 31:
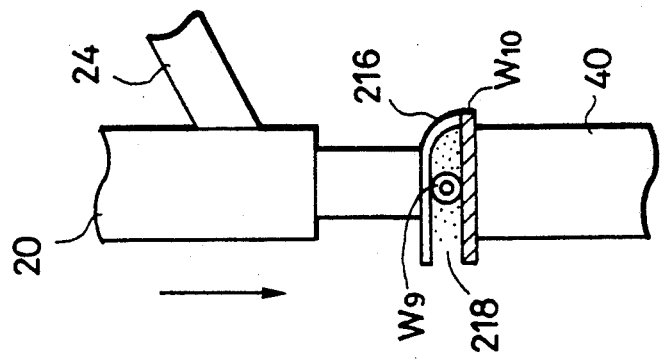
Figure 32:
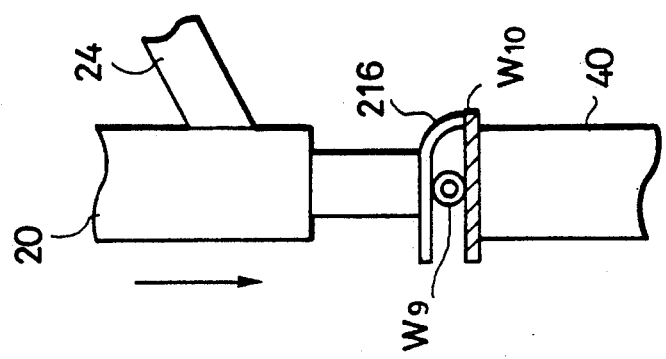

When the first electrode rod 20, caused to generate heat by the current supply, is lowered from the position of FIG. 30, it forces the nipping piece 216 of the terminal W10 to bend, so that the covered lead wire W9 is mechanically held between the terminal W10 and the piece 216 under a predetermined pressure, as shown in FIG. 31. At this time, the terminal W10 and the nipping piece 216 are quickly heated by means of the first electrode rod 20. After the rod 20 is brought into contact with the piece 216, moreover, a current, i.e., a fusing current, flows between the first electrode rod 20 and the fixed electrode rod 40 via the terminal W10, so that the terminal W10 is also heated by means of the rod 40. Thus, the covered layer of the covered lead wire W9 held between the terminal W10 and the nipping piece 216 is heated to be carbonized, so that the wire W9 and the terminal W10 are connected electrically to each other. FIG. 32 shows dust 218 produced by the carbonization of covering layer material.

Figure 33:
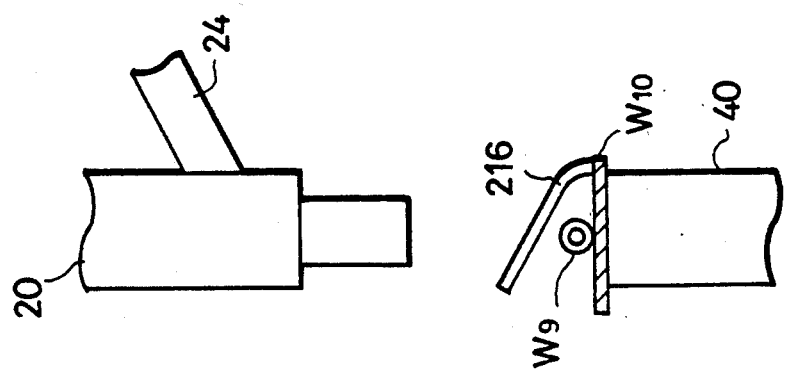

When the solder is supplied between the terminal W10 and the nipping piece 216, thereafter, the dust 218 is forced out to be removed from between the terminal W10 and the piece 216 while the solder is being melted. Thereupon, only molten solder 220 remains between the terminal W10 and the covered lead wire W9, as shown in FIG. 33. Thereafter, the molten solder 220 is rapidly solidified by cooling by means of the first electrode rod 20 and the fixed electrode rod 40, whereupon the connection between the lead wire W9 and the terminal W10 is completed.

In handling the covered lead wire W9 and the terminal W10 in this manner, the apparatus of the present invention can electrically connect them without previously stripping the lead wire W9. Since the apparatus of the invention can supply the solder to the region between the covered lead wire W9 and the terminal W10, moreover, it can ensure the electrical connection between these two workpieces, and also remove the carbonized covering layer material. The fixed electrode rod 40 may be replaced with a simple support rod provided that the stripping of the covered lead wire W9 and the melting of the solder can be effected by only causing the first electrode rod 20 to generate heat.

Referring to FIG. 34, there is shown a combination of a crimp terminal W11 and a covered lead wire W12 for use as workpieces. The apparatus of the present invention can be also used for the electrical connection between these workpieces W11 and W12. In this case, a crimp portion of the terminal W11 is designated by symbol A, and the leading end portion of the covered lead wire W12 is supposed to have already been stripped.

First, the covered lead wire W12 and the terminal W11 are placed on the fixed electrode rod 40 or the rest 200 in a manner such that the leading end portion of the wire W12 is passed between a pair of crimp pieces 222, as shown in FIG. 35. In this case, the lower end face of the first electrode rod 20 has a shape suited for the crimp pieces 222 to be caulked.

Figure 36:
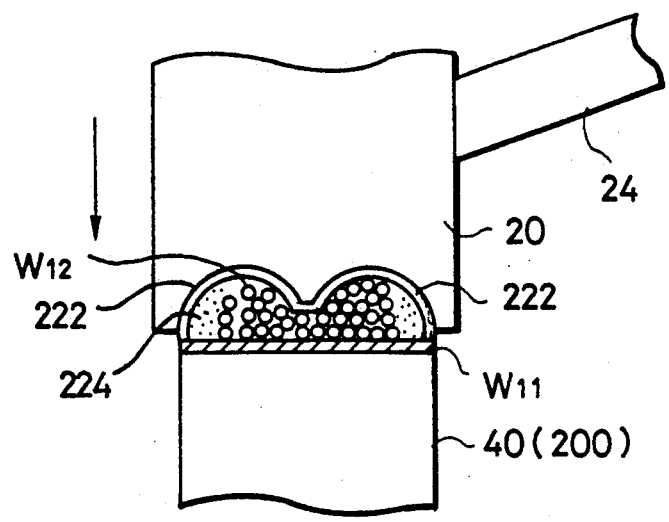

When the first electrode rod 20, caused to generate heat by the current supply, is lowered in this state, the crimp pieces 222 of the terminal W11 are caulked on the leading end portion of the covered lead wire W12, as shown in FIG. 36, whereby the terminal W11 and the wire W12 are connected electrically to each other. If solder 224 is supplied to the crimp portion A as the crimp pieces 222 are caulked, it melts and fills up the space between the leading end portion of the lead wire W12 and the pieces 222. Thus, the solder 224 ensures the electrical contact between the covered lead wire W12 and the terminal W11. The solder may be supplied after the crimp pieces 222 are fully caulked.

It is to be understood that solidification of the molten solder 224 is accelerated thereafter by cooling by means of the first electrode rod 20.

Figure 37:
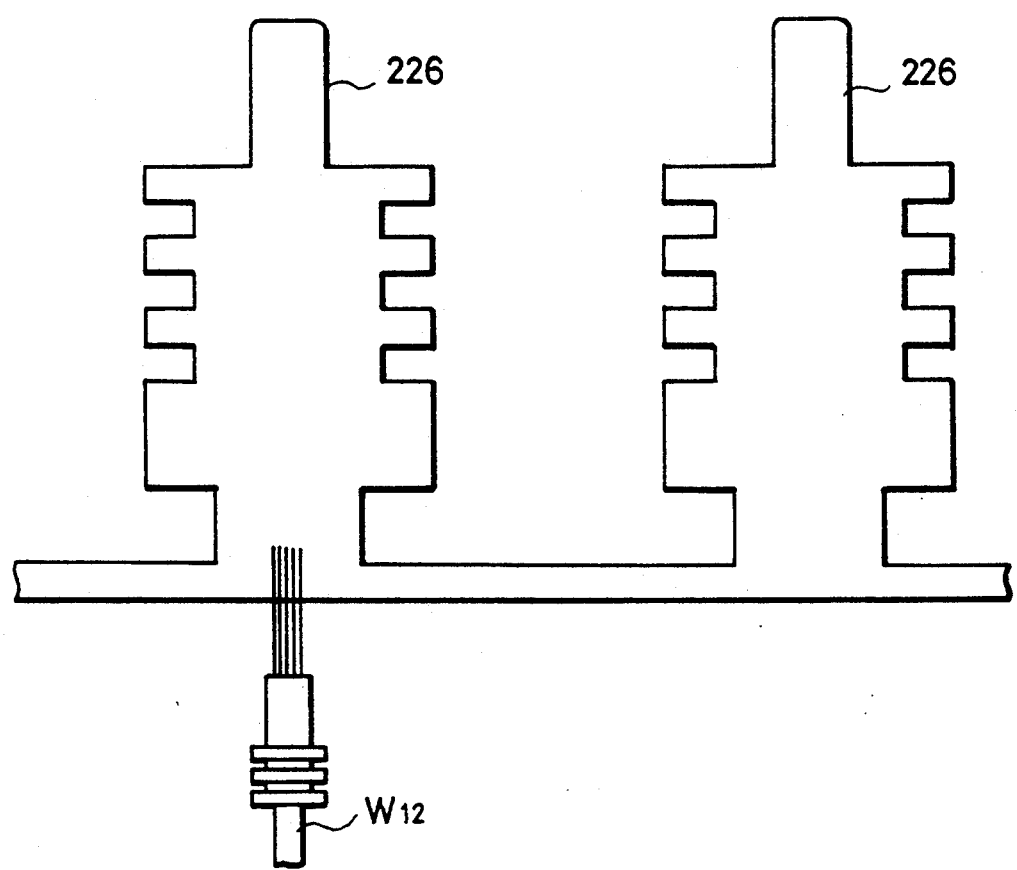
FIG. 37 is a plan view showing the relationship between the covered lead wire and a developed sheet shaped as the crimped terminal of FIG. 34.

As shown in FIG. 37, the terminal W11 is formed by bending a developed piece 226 which is obtained by stamping an electrically conductive metal sheet. If the apparatus of the present invention is used in combination with a machine for forming the terminal W11, the caulking of the crimp pieces 222 and the soldering can be effected as the terminal W11 is formed.

The crimp terminal W11 is not limited to the one shown in FIG. 37, and may be a crimp terminal W13 shown in FIG. 38. A crimp portion A of the terminal W13 is hollow cylindrical in shape. In this case, a convex hemispherical portion is formed on the lower end face of the first electrode rod 20, while an arcuate surface to receive the crimp portion A is formed on the upper end face of the fixed electrode rod 40 (or rest 200), as shown in FIG. 39.

Figure 40:
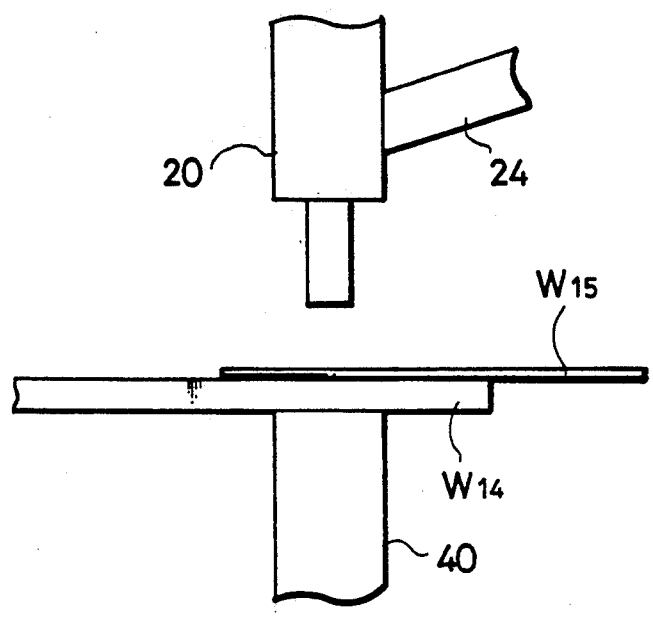
FIG. 40 is a view showing a plate and a wire for use as workpieces.
Figure 41:
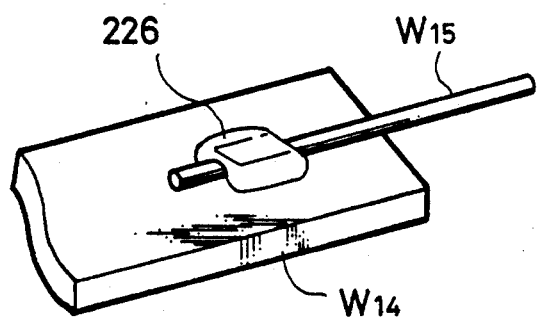
FIG. 41 is a perspective view showing the plate and the wire soldered after spot welding.

Further, the apparatus of the present invention can be also used to solder workpieces to each other after spot-welding these workpieces by controlling the current flowing between them. Referring to FIG. 40, for example, there is shown a combination of a plate W14 and a wire W15 for use as workpieces. In this case, the plate W14 and the wire W15 are held between the first electrode rod 20 and the fixed electrode rod 40 as they are spot-welded. Thereafter, the first electrode rod 20 is narrowly separated from the wire W15, the solder 226 is supplied, and the wire W15 is pressed again against the plate W14 by means of the first electrode rod 20. In this state, the electrode rods 20 and 40 are compulsorily cooled to solidify the solder 226, whereby the plate W14 and the wire W15 are connected to each other, as shown in FIG. 41.

If the plate W14 and the wire W15 are soldered together after they are temporarily tacked to each other by spot welding, as described above, their thermal conductivity is increased, so that the molten solder can diffuse satisfactorily. Thus, the soldering strength is considerably improved. The combination of soldering and welding ensures electrical connection between the plate W14 and the wire W15.

Figure 42:
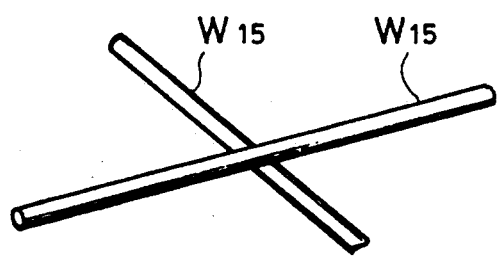
FIG. 42 is a perspective view showing a combination of wires for use as workpieces.

Furthermore, the apparatus of the present invention can not only connect two wires W15 to each other by welding and soldering, as shown in FIG. 42, but also connect copper to copper or copper to brass, a delicate combination for welding, by soldering the materials together after they are temporarily tacked to each other by spot welding.

What is claimed is:

1. An apparatus for heating workpieces to bond the workpieces together, comprising:

a workpiece rest;

an electrode unit including a first electrode rod and a second electrode rod, the first electrode rod being capable of holding the workpieces at one end thereof in cooperation with the workpiece rest and the first electrode rod having another end, the second electrode rod having one end disposed in contact with one end portion of the first electrode rod and having another end, the first and second electrode rods each having a predetermined contact surface at which the first and second electrode rods contact each other;

cooling means for cooling the first and second electrode rods with a coolant;

current supply means connected to said another end of each of the first and second electrode rods, the current supply means supplying a predetermined electric current to the contact surfaces of the first and second electrode rods, to cause the first and second electrode rods, which are cooled by the cooling means, to generate heat by means of contact resistance at the contact surfaces;

actuating means for moving the electrode unit toward and away from the workpiece rest, the workpieces being held between said one end of the first electrode rod and the workpiece rest with a predetermined force when the electrode unit is moved to the workpiece rest; and control means for controlling supply of the electric current from the current supply means to the first and second electrode rods in accordance with movement of the electrode unit when the electrode unit is moved toward the workpiece rest by the actuating means;

said control means comprising:

a sensor for outputting a detection signal when a distance between said one end of the first electrode rod and the workpieces on the workpiece rest becomes equal to a predetermined distance while the electrode unit is moved toward the workpiece rest; and first switch means for initiating the supply of electric current from the current supply means to the first and second electrode rods to cause the first and second electrode rods to generate heat when said first switch means is supplied with the detection signal from the sensor.

2. An apparatus according to claim 1, wherein said control means further includes second switch means for interrupting the supply of electric current from the current supply means to the first and second electrode rods when a predetermined time has elapsed after reception of the detection signal from the sensor, to permit the first and second electrode rods to be effectively cooled by the cooling means.

3. An apparatus according to claim 2, wherein said control means further includes third switch means for outputting an end signal when a predetermined time has elapsed after the effective cooling of the first and second electrode rods is started by the second switch means.

4. An apparatus according to claim 3, wherein said cooling means includes cooling jackets individually surrounding the first and second electrode rods and continually supplied with a coolant during the operation of the apparatus.

5. An apparatus according to claim 3, wherein said workpiece rest includes a fixed electrode rod formed of the same material as the first and second electrode rods, said workpieces being holdable between the first electrode rod and the fixed electrode rod, and said cooling means further includes a cooling jacket surrounding the fixed electrode rod and supplied with the coolant.

6. An apparatus according to claim 5, wherein said current supply means includes a first feeder line for supplying current to the first and second electrode rods and a second feeder line for supplying current to the fixed electrode rod.

7. An apparatus according to claim 6, wherein said second feeder line is connected to the first feeder line, and said current supply means includes a voltage source common to the electrode rods, said voltage source being disposed in the middle of the first feeder line.

8. An apparatus according to claim 3, further comprising supplying means for supplying solder to the workpieces held between the first electrode rod and said workpiece rest.

9. An apparatus according to claim 8, wherein said supplying means includes:
a reel around which wire solder is wound,
a drive motor for rotating the reel in forward and reverse directions, and
second control means for controlling the direction of rotation of the drive motor such that the solder is fed from the reel toward the workpiece rest or such that the solder fed to the workpiece rest is returned to the reel.

10. An apparatus according to claim 9, wherein said second control means includes:
fourth switch means for driving the drive motor in one direction for a predetermined feed time to supply the solder when a predetermined standby time has elapsed after reception of the detection signal from the sensor, and
fifth switch means for driving the drive motor in an opposite direction for a predetermined return time to return the solder when a second predetermined standby time has elapsed after lapse of the feed time.

11. An apparatus according to claim 3, further comprising means for varying the direction of access of the movable electrode unit to said workpiece rest.

12. An apparatus according to claim 3, wherein said control means further includes a display unit which is operated when the end signal is output from the third switch means.

13. An apparatus according to claim 12, wherein said display unit includes a display lamp.

14. An apparatus according to claim 12, wherein said control means further includes:
a second sensor for outputting a second detection signal when a distance between the workpiece rest and said one end of the first electrode rod becomes equal to a predetermined distance while the electrode unit is moved away from the workpiece rest; and
fourth switch means for stopping the operation of the display unit when said fourth switch means is supplied with the second detection signal from the second sensor.

15. An apparatus according to claim 14, wherein said first and second switch means include a limit switch for outputting the first and second detection signals, respectively.

16. An apparatus according to claim 14, wherein said actuating means includes:
urging means for urging the electrode unit in a direction to separate same from the workpiece rest with a predetermined force to thereby position the electrode unit in a predetermined inoperative position, and
operating means for producing a predetermined operating force to move the electrode unit toward the workpiece rest against the urging force exerted by the urging means.

17. An apparatus according to claim 16, wherein said operating means includes a foot pedal.

18. An apparatus according to claim 3, wherein said actuating means includes:
an air cylinder connected to the electrode unit,
a foot switch for actuating the air cylinder to start movement of the electrode unit toward the workpiece rest; and
further switch means for stopping the actuation of the air cylinder when said further switch means is supplied with the end signal from the third switch means.

* * * * *